(12) United States Patent
Pabla et al.

(10) Patent No.: US 8,041,798 B1
(45) Date of Patent: Oct. 18, 2011

(54) SELF-HEALING GRID MECHANISM

(75) Inventors: Kuldipsingh A. Pabla, Santa Clara, CA (US); Juan C. Soto, San Francisco, CA (US)

(73) Assignee: Oracle America, Inc., Redwood City, CA (US)

( * ) Notice: Subject to any disclaimer, the term of this patent is extended or adjusted under 35 U.S.C. 154(b) by 1422 days.

(21) Appl. No.: 10/828,955

(22) Filed: Apr. 21, 2004

Related U.S. Application Data

(63) Continuation-in-part of application No. 10/659,820, filed on Sep. 11, 2003.

(51) Int. Cl.
 *G06F 15/173* (2006.01)
 *G06F 15/16* (2006.01)
(52) U.S. Cl. ......... 709/223; 709/201; 709/202; 709/203
(58) Field of Classification Search .................. 709/201, 709/202, 203, 223
 See application file for complete search history.

(56) References Cited

U.S. PATENT DOCUMENTS

| | | | | |
|---|---|---|---|---|
| 6,009,455 | A * | 12/1999 | Doyle ........................... | 709/201 |
| 6,192,401 | B1 * | 2/2001 | Modiri et al. ................. | 709/220 |
| 7,376,693 | B2 * | 5/2008 | Neiman et al. ................ | 709/201 |
| 2003/0074393 | A1 * | 4/2003 | Peart ........................... | 709/203 |
| 2003/0074402 | A1 * | 4/2003 | Stringer-Calvert et al. .. | 709/203 |
| 2003/0200347 | A1 * | 10/2003 | Weitzman ..................... | 709/310 |
| 2004/0024891 | A1 * | 2/2004 | Agrusa et al. ................. | 709/230 |
| 2004/0034807 | A1 * | 2/2004 | Rostowfske ..................... | 714/4 |
| 2004/0064548 | A1 * | 4/2004 | Adams et al. ................. | 709/224 |
| 2004/0098447 | A1 * | 5/2004 | Verbeke et al. ............... | 709/201 |
| 2004/0210673 | A1 * | 10/2004 | Cruciani et al. ............. | 709/246 |

OTHER PUBLICATIONS

Sun Grid Architecture Document, as found in the Applicant's Information DIsclosure Statement.*
"Sun Cluster Grid Architecture- A Technical White Paper Describing the Foundation of Sun Grid Computing," Sun Microsystems, May 2002, (45 pages).
"An Overview of Grid Computing from Sun—Sun Powers the Grid," Sun Microsystems, 2001, (8 pages).
"Sun Grid Engine Software," www.sun.com/software/gridware, Feb. 15, 2001, (3 pages).
Wolfgang Gentzsch, "Grid Computing with Sun," Sun Microsystems, Oct. 2001, (16 pages).
"Sun HPC 2.0 Software—The Power of Parallel Processing," www.sun.com/servers/hpc/software/, Feb. 18, 2001, (1 page).
Wolfgang Gentzsch, "Sun Grid Engine Support for Portals & Grids," Sun Microsystems, Jun. 2001, (18 pages).

(Continued)

*Primary Examiner* — Thu Nguyen
*Assistant Examiner* — Joseph Greene
(74) *Attorney, Agent, or Firm* — Robert C. Kowert; Meyertons, Hood, Kivlin, Kowert & Goetzel, P.C.

(57) ABSTRACT

A self-healing grid mechanism using peer-to-peer platform protocols. In one embodiment, two or more nodes on a grid may be configured as master nodes. One of the configured master nodes may serve as the actual master node, and one may be backup or "shadow" master node, not actively serving as a master node. If the active master node goes down, the peer-to-peer protocols may be used to detect that the master node is not active and the backup master node may take over the master node operations for the grid. The backup master node may "shadow" the master node, keeping updated information about the grid configuration and operations via the peer-to-peer platform protocols, so that it can assume grid management operations seamlessly.

40 Claims, 15 Drawing Sheets

OTHER PUBLICATIONS

"Sun Grid Engine, Enterprise Edition 5.3 Administration and User's Guide," Sun Microsystems, Apr. 2002, (2 pages).

"The SETI@home Sky Survey," 1999, (5 pages) http://setiathome.ssl.berkeley.edu/sciencepaper, Nov. 4, 1999, (5 pages).

* cited by examiner

SELF-HEALING GRID MECHANISM

CONTINUATION DATA

This application is a continuation-in-part of U.S. patent application Ser. No. 10/659,820, titled "Autonomic Grid Computing Mechanism" filed Sep. 11, 2003.

BACKGROUND OF THE INVENTION

1. Field of the Invention

This invention relates to network computing, and more particularly to grid computing systems.

2. Description of the Related Art

Grid computing enables organizations to use their distributed computing resources more efficiently and flexibly, providing more usable power out of existing systems—and helping organizations gain a competitive business advantage. Conceptually, a grid is quite simple: it is a collection of computing resources connected through a network. Grid middleware aggregates these resources—e.g. servers, storage, databases, and scientific instruments—and provides transparent, remote, and secure access to computing power wherever and whenever it is needed. Grid computing aggregates resources and delivers computing power to every user in the network. A compute grid may include distributed compute resources including one or more of, but not limited to: desktop, server, and High Performance Computing (HPC) systems. Grid computing may provide benefits not available with traditional computing models including one or more of, but not limited to: better utilization of resources, increased user productivity, scalability, and flexibility.

The simplest form of a grid, a Cluster Grid, consists of multiple systems interconnected through a network. Cluster Grids may contain distributed workstations and servers, as well as centralized resources in a data center environment. Typically owned and used by a single project or department, Cluster Grids support both high throughput and high performance jobs. Common examples of the Cluster Grid architecture include compute farms, groups of multi-processor HPC systems, Beowulf clusters, and networks of workstations (NOW).

Cluster Grids typically employ a standard three-tier system architecture, as shown in FIG. 1 (prior art). The architecture includes front-end access nodes, middle-tier management nodes, and back-end compute nodes. The access tier provides access and authentication services to the Cluster Grid users. The Management Tier is the middle tier and includes one or more servers that run the server elements of client-server software such as Distributed Resource Management (DRM), hardware diagnosis software, and system performance monitors. The size and number of servers in this tier may vary depending on the type and level of services to be provided. For small implementations with limited functionality, a single node can be chosen to host all management services for ease of administration. Alternatively, these functions may be provided by multiple servers for greater scalability and flexibility. The Compute Tier supplies the compute power for the Cluster Grid. Jobs submitted through upper tiers in the architecture are scheduled to run on one or more nodes in the compute tier. Nodes in this tier run the client-side of the DRM software, the daemons associated with message-passing environments, and any agents for system health monitoring. The compute tier communicates with the management tier, receiving jobs to run, and reporting job completion status and accounting details.

FIG. 2 illustrates an exemplary prior art grid farm. A grid farm may include one or more compute (or execution) nodes 104 and a master node 100. A job submitter (access) node 106 submits jobs to a master node 100. The master node 100 dispatches the jobs to various compute nodes 104. Compute nodes 104 crunch the numbers and return results back to the master node 100, which in turn provides the results to the job submitter node 106. In a prior art grid farm, the master node 100 and compute nodes 104 are configured manually.

Sun's Cluster Grid Architecture

Grid computing systems typically use a traditional model where a Grid Farm has a static view of the network. Sun's Cluster Grid implementation is an exemplary grid computing system that may be used for computation-intensive jobs. The following individual components may be included in Sun's Cluster Grid architecture:

Sun Grid Engine software
Development Tools and Run Time Libraries (e.g., Sun HPC ClusterTools™, Forte™ for HPC)
Technical Computing Portal software (e.g., Sun™ ONE Portal Server)
System Management Tools (e.g., Sun™ Management Center, SunVTS™, and Solaris JumpStart™ and Web Start Flash)
Underlying platform (e.g., Solaris Operating Environment, Sun servers, and Sun StorEdge storage products).

Sun Grid Engine software is a distributed management product that optimizes utilization of software and hardware resources. Sun Grid Engine finds a pool of idle resources and harnesses it productively, so an organization gets as much as five to ten times the usable power out of systems on the network. Sun Grid Engine software aggregates available compute resources and delivers compute power as a network service.

JXTA

Sun's JXTA is an exemplary peer-to-peer platform. Peer-to-peer platforms such as JXTA may provide protocols for building networking applications that thrive in dynamic environments. JXTA technology is a set of open protocols that allow any connected device on the network ranging from cell phones and wireless PDAs to PCs and servers to communicate and collaborate in a peer-to-peer (P2P) manner. JXTA peers create a virtual network where any peer can interact with other peers and resources directly even when some of the peers and resources are behind firewalls and NATs or are on different network transports. In JXTA, every peer is identified by an ID, unique over time and space. Peer groups are user-defined collections of entities (peers) that may share a common interest. Peer groups are also identified by unique IDs. Peers may belong to multiple peer groups, discover other entities and peer resources (e.g. peers, peer groups, services, content, etc.) dynamically, and publish themselves and resources so that other peers can discover them.

SUMMARY

Embodiments of a self-healing grid mechanism using peer-to-peer platform protocols are described. In one embodiment, two (or more) nodes on a grid may be configured as master nodes. One of the configured master nodes may serve as the actual master node, and one may be backup or "shadow" master node, not actively serving as a master node. If the active master node goes down, the peer-to-peer protocols may be used to detect that the master node is not active and the backup master node may take over the master node operations for the grid. The backup master node may "shadow" the master to node, keeping updated information about the grid configuration and operations via the peer-to-peer platform protocols, so that it can assume grid management operations seamlessly.

A backup master node may track and maintain information about a grid. In one embodiment, the backup master node may communicate with the master node of the grid using one or more peer-to-peer platform protocols to collect and maintain information about the one or more compute nodes of the grid. In one embodiment, the information about the one or more compute nodes may include, but is not limited to, state information about one or more jobs executing on the compute nodes. In one embodiment, the grid may be configured according to Sun Cluster Grid architecture. Other embodiments may use other grid architectures. In one embodiment, the peer-to-peer platform protocols may be JXTA protocols. Other embodiments may use other peer-to-peer platform protocols.

The master node managing operations of the grid may go down at some point. The backup master node may detect that the master node is down using one or more peer-to-peer platform protocols. In one embodiment, the backup master node may poll the master node using one or more peer-to-peer platform protocols, and may determine that the master node is down if the master node does not respond to the poll. In one embodiment, the master node may send a notification to the backup master node to inform the backup master node that it is going down and that the backup master node needs to assume management of the grid. In other embodiments, other mechanisms may be used to detect if the master node is down.

The backup master node may notify the compute nodes of the grid that it is assuming master node operations for the grid after determining that the master node is down. To determine the compute nodes of the grid, in one embodiment, the backup master node may discover compute nodes of the grid using one or more peer-to-peer platform protocols. In another embodiment, information about the one or more compute nodes of the grid may be obtained from the master node and maintained by the backup master node using one or more peer-to-peer platform protocols. In one embodiment, the backup master node may notify the one or more compute nodes of the grid that the backup master node is assuming management of the grid using one or more peer-to-peer platform protocols. The compute nodes may then update their grid configuration information to indicate that the backup master node is assuming management of the grid in response to the notification. In one embodiment, the backup master node may advertise that it is assuming management of the grid using one or more peer-to-peer platform protocols. Potential or existing compute nodes and any other node, such as job submitter nodes, may then discover that the backup master node is now the master node for the grid using one or more peer-to-peer platform protocols. The backup master node may then assume normal master node operations for the grid.

In one embodiment, if one of the compute nodes in a grid becomes unavailable, a master node can determine, using peer-to-peer platform protocols, that the compute node is no longer part of the grid. In one embodiment, the compute node may send notification of departure to the master node using a peer-to-peer platform protocol. Alternatively, the master node may poll the compute nodes using one or more peer-to-peer platform protocols to determine if and when a compute node goes away. If a job the compute node was working on was in progress, the master node may resubmit the job to another compute node for completion using one or more peer-to-peer platform protocols.

Figure 1:
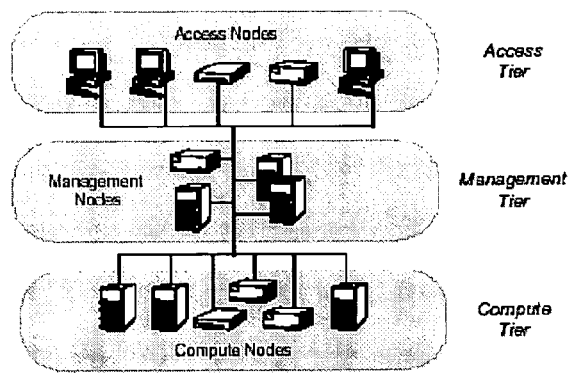
FIG. 1 illustrates a three-tier system architecture for cluster grids according to the prior art.
Figure 2:
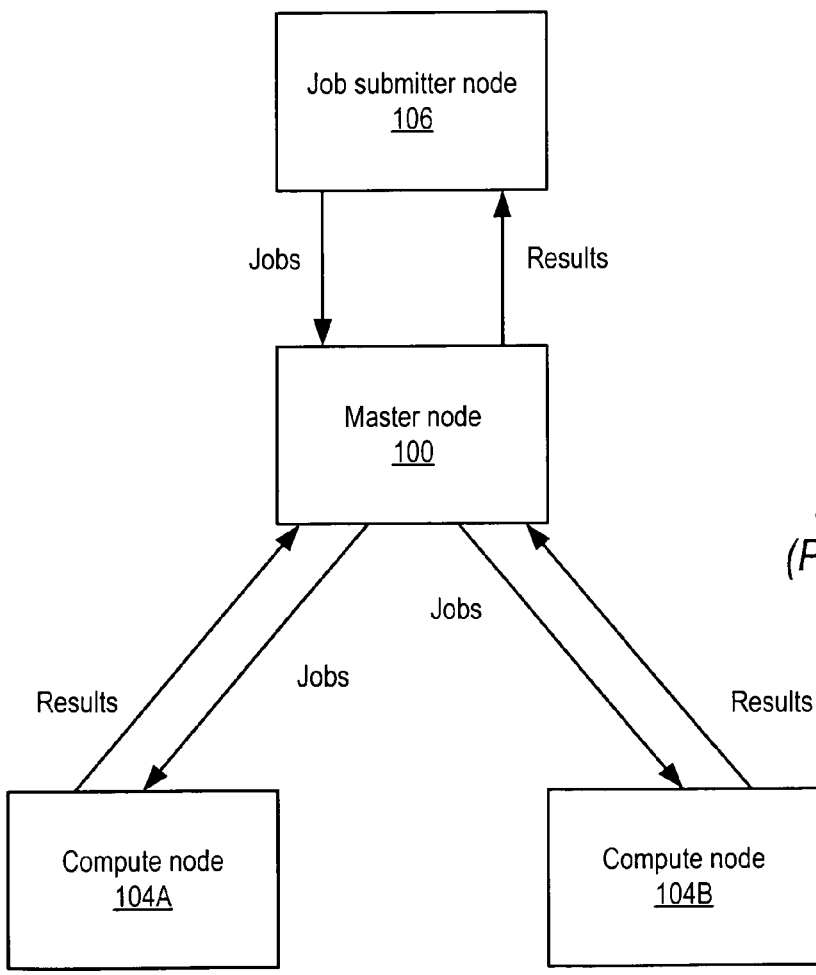
FIG. 2 illustrates a grid farm according to the prior art.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of an autonomic grid computing mechanism are described. Integrating peer-to-peer platform protocols with a grid computing system may enable the grid computing system to run in a heterogeneous network and to be self-maintaining. In embodiments, integrating peer-to-peer platform protocols (e.g. JXTA protocols) with a grid computing system such as the Sun Cluster Grid architecture and Grid Engine may enhance the grid computing system by enabling or improving one or more of, but not limited to: self-deployment and self-configuration, self-updating, node removal, monitoring, administration, load balancing, grid brokering, and decentralized grids. Embodiments may also allow multi-grid support with multiple master nodes in a single grid. Embodiments of the autonomic grid computing mechanism may provide one or more of, but not limited to: a reduced number of manual configurations; quicker deployment; reduced cost of deployment; and preferably simplified addition and removal of nodes in a grid farm.

Embodiments may use peer-to-peer platform protocols (e.g., JXTA protocols) as the transport for the grid computing system. In the prior art, grids typically use TCP/IP. Using peer-to-peer platform protocols may allow a grid computing system to extend and operate on a wider network, across firewalls and other such network barriers.

Embodiments of an autonomic grid computing mechanism may provide one or more mechanisms for adding new compute nodes and for removing compute nodes. Embodiments may allow for the rapid deployment of grid farms. Embodiments of an autonomic grid computing mechanism may provide capabilities including one or more of, but not limited to: multi-grid support, grid management, remote access/management, load balancing, and grid cell selection.

In one embodiment, grid master nodes may be configured manually. Peer-to-peer platform protocols and discovery mechanisms may be used to automatically configure compute nodes. In one embodiment, a bootstrapping mechanism or agent based on a peer-to-peer platform (e.g. JXTA) may be installed on (potential) compute nodes. The bootstrapping mechanism discovers a master node using a peer-to-peer platform discovery mechanism, informs the master node that the node is joining the network using one or more peer-to-peer platform protocols, and provides details of the node to the master node using one or more peer-to-peer platform protocols. When a potential compute node comes up, the node (through the bootstrapping mechanism) may search for a master node using the peer-to-peer platform discovery mechanism. When the potential compute node finds a master node, it may provide detail information about the compute node to the master node using one or more peer-to-peer platform protocols. Based on those details, the master node may know that the new compute node has joined the grid network, record the fact, and, depending on what the compute node's details are, configure the new compute node accordingly. In one embodiment, once the compute node discovers a master node, the peer-to-peer platform bootstrapping mechanism may terminate.

In one embodiment, the master node may send the new compute node one or more scripts, files, and other grid configuration information using one or more peer-to-peer platform protocols so that the node can self-configure to be grid-ready as a compute node. Before the master node provides the information, the compute node may have had no information about the grid, and may contain no software related to the grid other than the bootstrapping mechanism. Through the configuration over peer-to-peer platform protocols, the master node may send all necessary files and instructions (e.g., mount instructions, directories to share, what directories to put files in, permission changes, etc.) to a new compute node. Using this information, the new compute node may self-configure to become part of the grid network. Whenever a job comes in, the master node knows about the new compute node and may send the new job to the new compute node, in one embodiment using one or more peer-to-peer platform protocols.

Note that, in a network, a potential compute node discovering a master node may be a new node joining the network, a compute node that needs upgrading, or a compute node that was shut down and is coming up again. In one embodiment, hen a compute node reboots, it may inform the master node that it is a new node but that it is already partially or fully configured. In this instance, the master node may not need to fully configure the new node. Depending on the status of the compute node provided to the master node, the master node may determine that the compute node is partially configured and may provide additional configuration information, if necessary.

One embodiment may provide a mechanism for patch and/or upgrade management. For example, a compute node may have older software (e.g. version 1.0). The master node may be running newer software (e.g. version 1.1). The master node may determine from the information passed to it by the compute node that the compute node has the wrong version of software and may provide information such as how to upgrade, patches to install, and/or other upgrade information instructions to the compute node.

In one embodiment, peer-to-peer platform protocols may be used by compute nodes to discover master nodes and by master nodes to discover compute nodes. In one embodiment, if a master node knows there are (potential) compute nodes somewhere on the network, the master node may search for the compute nodes using one or more peer-to-peer platform protocols and discovery mechanisms and invite the compute nodes to join the grid.

Figure 3:
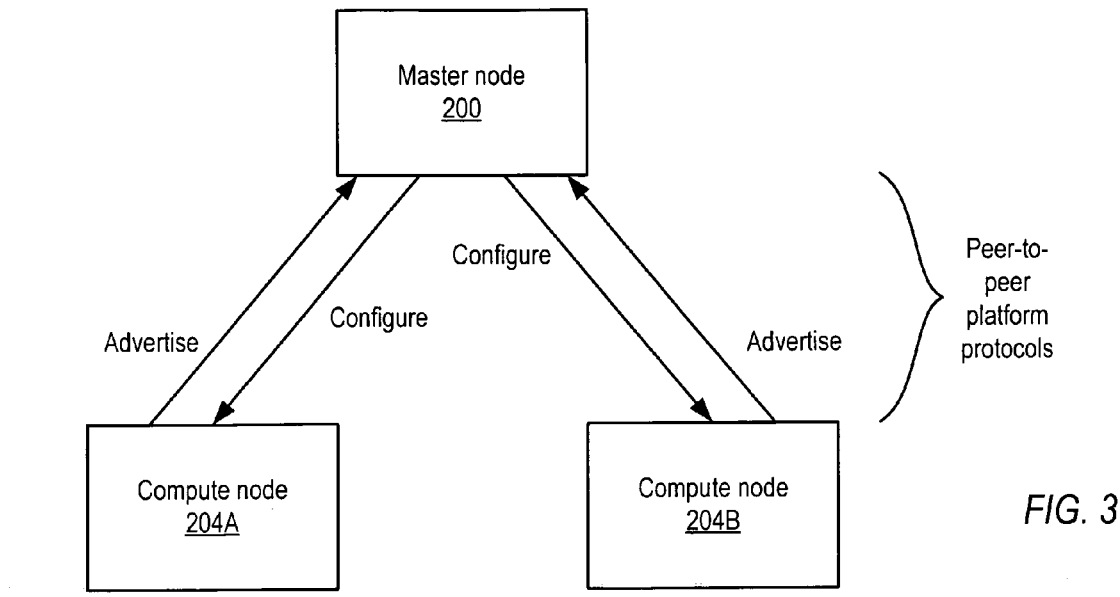
FIG. 3 illustrates deployment and configuration of nodes in a grid farm according to one embodiment.

FIG. 3 illustrates deployment and configuration of nodes in a grid farm according to one embodiment. In embodiments of the autonomic grid computing mechanism, integrating peer-to-peer platform protocols (e.g. JXTA protocols) with a grid computing system (e.g. Sun's Compute Grid architecture and Grid Engine) may enable the grid computing system to be self-deploying and self-configuring.

In one embodiment, deployment (installation and configuration) of the nodes in a grid farm may be automated using peer-to-peer platform (e.g. JXTA) discovery and communication protocols. In one embodiment, the master node 200 may be installed manually. In one embodiment, other nodes (e.g. compute nodes 204A and 204B or potential compute nodes) may be preloaded with a peer-to-peer platform-based (preferably, small footprint) bootstrapping mechanism or agent (not shown). When a new node 204 is deployed in a grid farm network, the bootstrapping mechanism searches for a master node 200 using one or more peer-to-peer platform protocols (e.g. JXTA Discovery protocols). Upon discovery, the new compute node 204 notifies the master node 200 about its presence and capabilities/configuration (e.g. hardware and software capabilities/configuration such as CPU power, disk space, installed software, OS, etc.) using one or more peer-to-peer platform communication protocols (e.g. JXTA Pipe protocols). In one embodiment, the new compute node 204 may notify the master node 200 about its presence and capabilities using advertisements (e.g. JXTA advertisements). The master node 200 then may configure the new compute node 204 and make it part of the grid farm, in one embodiment using one or more peer-to-peer platform communication protocols (e.g. JXTA Pipe protocols). In one embodiment, the master node 200 may send configuration data (e.g. binaries, scripts, NFS mount points, etc.) to the compute node 204. In one embodiment, when a session (job) is complete, the master node 200 may use one or more one or more peer-to-peer platform communication protocols (e.g. JXTA Pipe protocols) to signal the end of session to the compute nodes 204.

In one embodiment, as an alternative to the compute nodes 204 discovering the master nodes 200, a master node 200 may discover compute nodes 204. In this embodiment, the master nodes 200 may be manually configured. The compute nodes 204 may be automatically configured. A master node 200 may use a peer-to-peer platform discovery mechanism (e.g. JXTA's discovery service) to discover one or more compute nodes 204. The master node 200 may then configure the discovered compute nodes 204 using one or more peer-to-peer platform communication services (e.g. JXTA Pipe service). In one embodiment, when a session (job) is complete, the master node 200 may use one or more one or more peer-to-peer platform communication services (e.g. JXTA Pipe service) to signal the end of session to the compute nodes 204.

Figure 4:
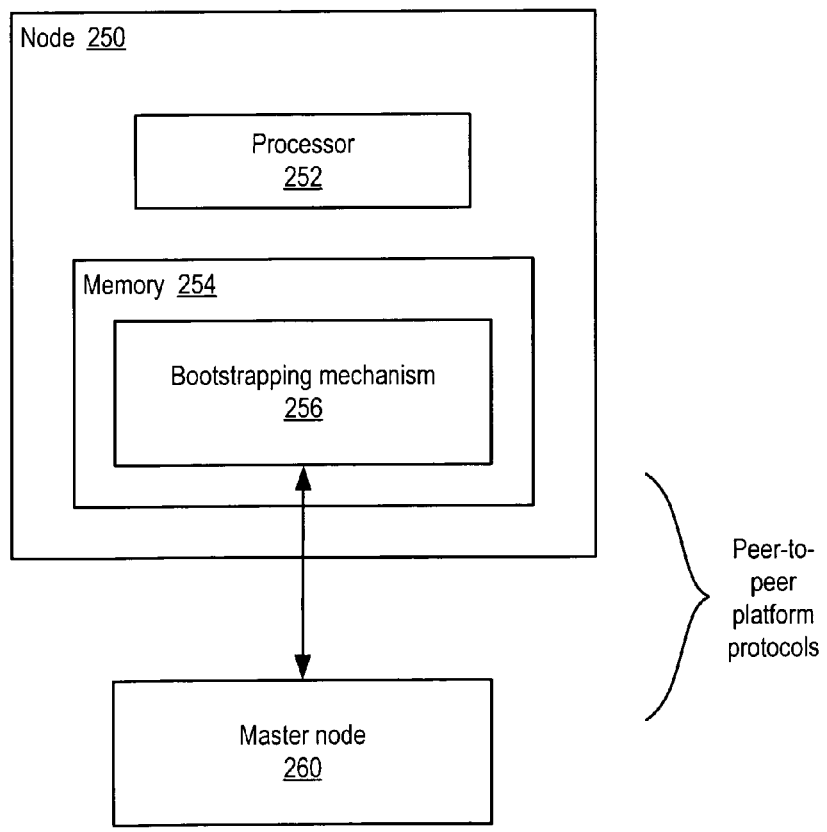
FIG. 4 illustrates a system implementing a bootstrapping mechanism according to one embodiment.

FIG. 4 illustrates a system (node 250) implementing a bootstrapping mechanism according to one embodiment. Node 250 may be any of various types of devices, including, but not limited to, a personal computer system, desktop computer, laptop or notebook computer, mainframe computer system, workstation, network computer, or other suitable device. Node 250 may include at least one processor 252. The processor 252 may be coupled to a memory 254. Memory 254 is representative of various types of possible memory media, also referred to as "computer readable media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof. Node 250 may couple over a network to one or more other devices via one or more wired or wireless network interfaces.

Node 250 may include, in memory 254, a bootstrapping mechanism 256. In one embodiment, node 250 may be preloaded with bootstrapping mechanism 256. When node 250 is deployed in a grid farm network, the bootstrapping mechanism 256 searches for a master node 260 using one or more peer-to-peer platform protocols. Upon discovery of master node 260, node 250 may notify the master node 260 of its presence and capabilities/configuration using one or more peer-to-peer platform communication protocols. The master node 260 then may send configuration information to node 250 using one or more peer-to-peer platform protocols, and node 250 may then use the configuration information to self-configure as a compute node in the grid farm.

Figure 5:
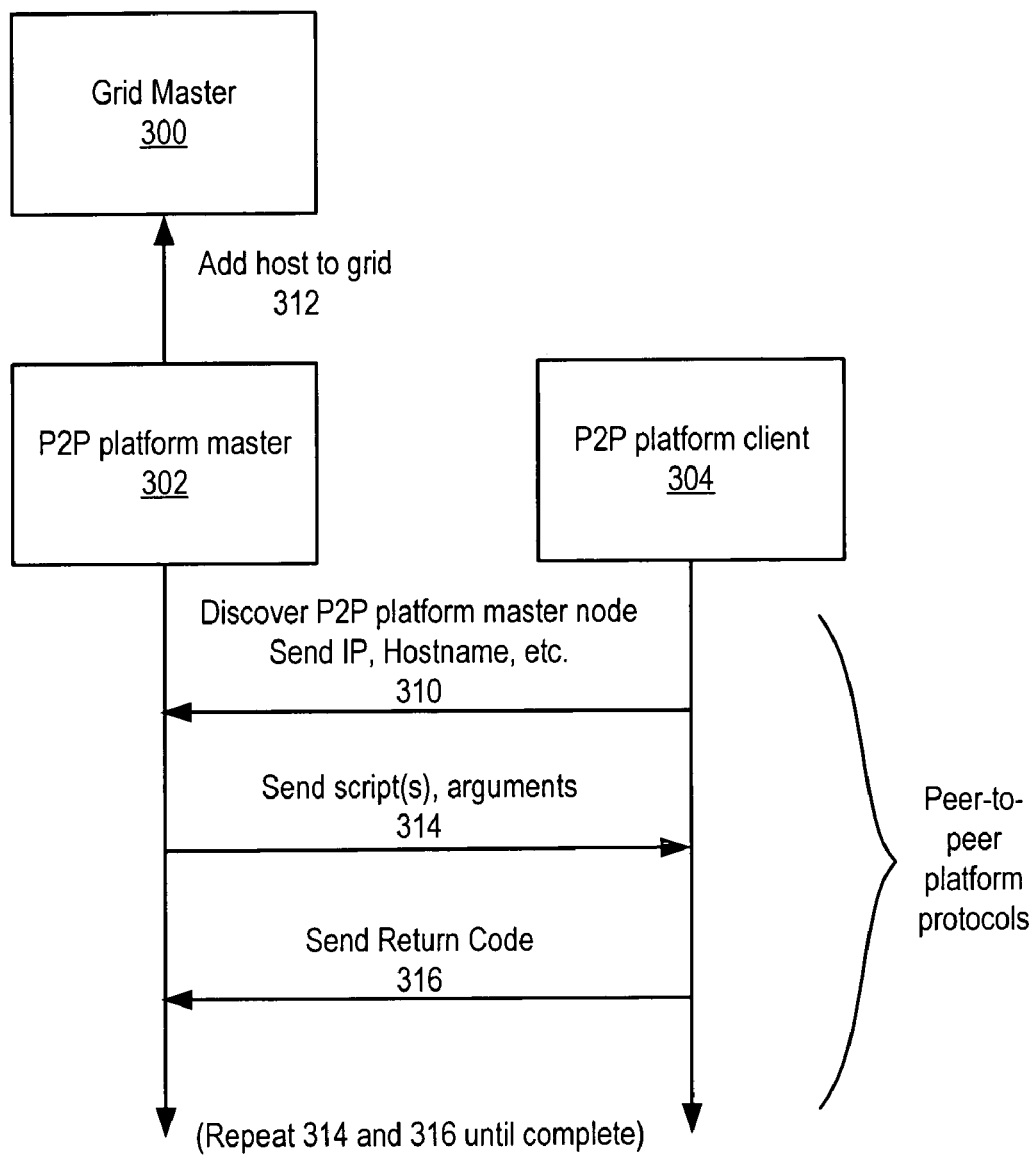
FIG. 5 illustrates a grid installation procedure according to one embodiment.

FIG. 5 illustrates a grid installation procedure according to one embodiment. In one embodiment, a peer-to-peer (P2P) platform agent (e.g. a JXTA agent) discovers another peer-to-peer platform agent (e.g., on its subnet) with which it can communicate. The peer-to-peer platform agent may then communicate with the discovered agent to receive scripts and arguments with which it may self-configure as part of the grid.

In one embodiment, the installation and setup of the P2P platform (e.g., JXTA) master 302 may be performed manually. In one embodiment, a setup file on P2P platform master 302 may include, but is not limited to, the following information: Master Hostname, Master IP, Mount Point, and Command port.

In one embodiment, P2P platform master 302 may include one or more scripts that are configured for use by a P2P platform client 304 to self-install as an execution host (i.e. compute node).

In one embodiment, as indicated at 310, installation may begin with the P2P platform client 304 sending a multicast discovery with its IP address and hostname embedded in the message. As indicated at 312, P2P platform master 302 may then add the execution host to the grid. In one embodiment, this may include setting up the necessary files and informing a grid master 300 of the addition of this host to the grid, for example by sending a command (in an exemplary embodiment using Sun's Grid Engine and JXTA, a qconf-ah command). In one embodiment, this command is preferably run on an administrative host within the grid. In one embodiment, the host that this command is run on is preferably able to resolve the hostname of the P2P platform client 304. In one embodiment, this may be a simple command, either adding this host to a file (e.g. /etc/hosts file) or checking if the P2P platform master 302 can resolve this host and adding on the negative. The peer-to-peer platform IDs (e.g. JXTA ID) of the systems that have been found may be tracked, for example for use in keeping track of the status of the system.

As indicated at 314, script(s) and/or arguments may be sent from P2P platform master 302 to P2P platform client 304. In one embodiment, P2P platform master 302 sends one or more scripts along with arguments to be run on the script(s) in one or more messages (e.g. peer-to-peer platform protocol messages). In one embodiment, P2P platform client 304 may then read the script(s) from the message(s), create a file, and then run the script(s) with the arguments from the message specified within the script.

As indicated at 316, P2P platform client 304 may then send return code to P2P platform master 302. Once P2P platform client 304 is finished running the script, it may send return code back to P2P platform master 302. This return code may, for example, be used to deal with errors that may occur within the scripts, may be logged, and/or may be used in carrying out further action dependent on the return code.

In one embodiment, 314 and 316 (receiving and running the script(s) and arguments) may be repeated with other scripts until the installation has completed successfully. Script actions that may be performed may include one or more of, but are not limited to:
- add the grid computing system master name and IP address to a file (e.g., /etc/hosts)
- add a command port number to a file (e.g. /etc/services)
- add the grid computing system administrator to this host
- mount a grid engine directory from a master or NFS server
- run a grid computing system "install compute node" script Note that, in one embodiment, this list may reflect the order that the script actions are preferably run in, but in other embodiments, the actions may be performed in other orders, one or more actions may be left out, and/or one or more additional actions may be performed. In one embodiment, the grid computing system may be the Sun Grid Engine (SGE). Once these actions have been completed, the compute node (on P2P platform client 304) will be part of the grid and may be able to run jobs that have been submitted to its queue by P2P platform master 302.

In one embodiment, a peer-to-peer platform (e.g. JXTA) agent on a master node may track the peer-to-peer platform identifiers of each installed host (i.e. compute node) and/or the peer-to-peer platform identifiers of each host that attempts to install. This may allow a status or state to be maintained for each host (compute node) that is installed (or not installed). In one embodiment, this state may be one of: Installed, Uninstalled, or Error.

Figure 6:
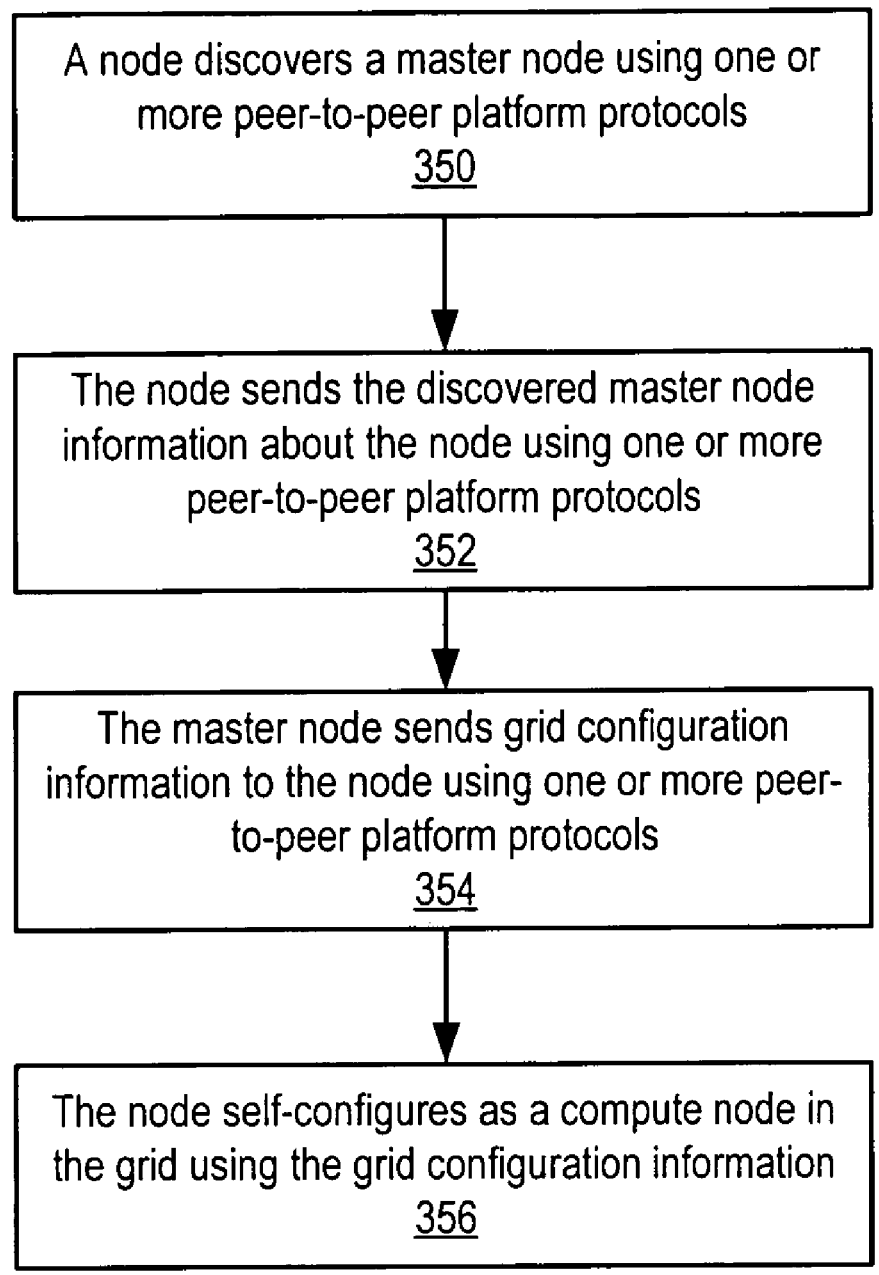
FIG. 6 is a flowchart of a method for self-configuration in a grid according to one embodiment.

FIG. 6 is a flowchart of a method for self-configuration in a grid according to one embodiment. As indicated at 350, a node discovers a master node using one or more peer-to-peer platform protocols, e.g. JXTA protocols. The master node is configured to manage a grid of one or more compute nodes, for example using Sun Cluster Grid architecture. As indicated at 352, the node may send the discovered master node information about the node using one or more peer-to-peer platform protocols. In response to the node informing the master node of its presence and sending information about the node, the master node may send grid configuration information to the node using one or more peer-to-peer platform protocols. The node may then self-configure as a compute node in the grid using the grid configuration information.

In one embodiment, the node may be a new node or a node that was previously configured as a compute node. In the latter case, to self-configure, the node may update its compute node configuration using the grid configuration information. In one embodiment, if the node was previously configured as a compute node, the information the node sends to the master node may include compute node configuration information for the node. The master node may determine that the compute node configuration needs to be updated from the compute node configuration information. The master node may then include update information for the compute node configuration in the grid configuration information sent to the node.

After the node has self-configured as a compute node in the grid, the master node may record, track, and manage the presence and activity of the new compute node in the grid. In one embodiment, the master node may receive jobs from one or more job submitter nodes using one or more peer-to-peer platform protocols. The master node may distribute one or more jobs to the compute nodes, including the new compute node, for execution using one or more peer-to-peer platform protocols. The master node may receive results of the execution from the compute nodes using one or more peer-to-peer platform protocols, and the master node may then send the results to the job submitter node using one or more peer-to-peer platform protocols.

In one embodiment, if the node later needs to leave the grid, the node may send the master node notification that it is leaving the grid using one or more peer-to-peer platform protocols. In one embodiment, the master node may poll or otherwise track the compute nodes in the grid using one or more peer-to-peer platform protocols. In one embodiment, if the master node has submitted a job to the node for execution that has not completed, after determining or detecting that the node has left the grid, the master node may resubmit the job to another compute node of the grid for execution using one or more peer-to-peer platform protocols.

In one embodiment, peer-peer-platform (e.g. JXTA) discovery protocols may enable a grid farm to be dispersed geographically at different locations. This may enable a grid farm to be spread among two or more different physical locations instead of all the nodes being deployed at the same physical location (e.g. room).

Self-Updating Grids

In one embodiment, a grid farm may be self-updating. In one embodiment, each node in a grid farm may maintain information including one or more of, but not limited to: the version of the grid engine it is using, if it failed during configuration process, etc. In one embodiment, when a compute node reboots, it may inform the master node about its current status, and the master node may appropriately upgrade/configure the compute node, if necessary. In one embodiment, if a compute node is determined to be properly configured and is running a correct version of grid computing system (grid engine) software, it is preferably not reconfigured. In one embodiment, software upgrades may be performed using a centralized solution such as JNLP, CVS, or other software upgrade methods.

In one embodiment, rather than relying on centralized updating for compute nodes, compute nodes may be updated from a "nearby" peer using one or more peer-to-peer platform (e.g. JXTA) protocols. The nearby peer may be a master node, another compute node, or even a peer that is not currently participating in the grid farm. For the purpose of this document, a "nearby peer" may be considered a logically nearby peer. A logically nearby peer is a peer that may respond as fast as or faster than other peers, but that may or may not be physically nearby or physically closer than at least some other peers. A physically nearby peer is a peer in close physical proximity. However, a physically nearby peer may or may not be logically nearby. In summary, a nearby peer may be considered a peer that is logically nearby which may or may not be physically nearby.

In one embodiment, a compute node may communicate with a nearby peer using one or more peer-to-peer platform (e.g. JXTA) protocols to determine if its grid computing software and/or data is up-to-date and, if not, may download updated software and/or data from the nearby peer. In another embodiment, a compute node may communicate with the master node using one or more peer-to-peer platform (e.g. JXTA) protocols to determine if its grid computing software and/or data is up-to-date and, if not, may communicate with a nearby peer (which may be another execution peer) using one or more peer-to-peer platform (e.g. JXTA) protocols to update its software/data.

Node Removal

Embodiments of an autonomic grid computing mechanism may provide a mechanism for node removal. When a compute node needs to leave a grid farm (temporarily or permanently), it may notify the master node using one or more peer-peer-platform (e.g. JXTA) protocols, and the master node may then gracefully remove the compute node from the grid farm. Embodiments of the installation, self-configuration and removal mechanisms described herein, using peer-peer-platform (e.g. JXTA) protocols, preferably enable any node to dynamically join a grid farm, self-configure, and to remove itself if necessary or desired.

Multi-Grid Support

Embodiments of an autonomic grid computing mechanism may provide a mechanism for multi-grid support. In this embodiment, there may be multiple master nodes, and thus multiple smaller grids (or grid cells), in a single (larger) grid. Through multi-grid support, job submitters may be configured to automatically select one of the grid cells for performing a particular job. Multi-grid support may also provide load balancing.

In the prior art, grids are monolithic, with one master node and multiple compute nodes. In this prior art architecture, the master node may be a bottleneck for performance and a single point of failure. There is just one master node, and under some conditions, the master node may not be able to dispatch jobs quickly and efficiently. In an embodiment of an autonomic grid computing mechanism that provides multi-grid support, instead of just having one big grid network, the grid network may be split into multiple smaller grids. The job submitter may use peer-to-peer platform protocols to determine which one of the smaller grids may be able to do the job more quickly, and/or to discover other information about the smaller grids that may be used to determine which of the smaller grids is best suited to do the job.

In one embodiment, a job submitter may use the peer-to-peer platform to search for and discover grids, and then determine which grid may perform a job faster and/or cheaper. The job submitter may use peer-to-peer platform (e.g. JXTA) protocols to acquire information about the various grids, and then the job submitter may determine which of the grids it wants to send a job to based on the acquired information. Based on one or more criteria, the job submitter may determine which grid it wants to perform the job. For example, one of the grids may be overloaded, but another grid may be idle. A job submitter may also, for example, look for a grid that matches particular requirements. A particular job may have particular processing requirements, for example graphics processing requirements, and the job submitter may look for a grid that includes at least one compute node with a graphics engine.

Figure 7:
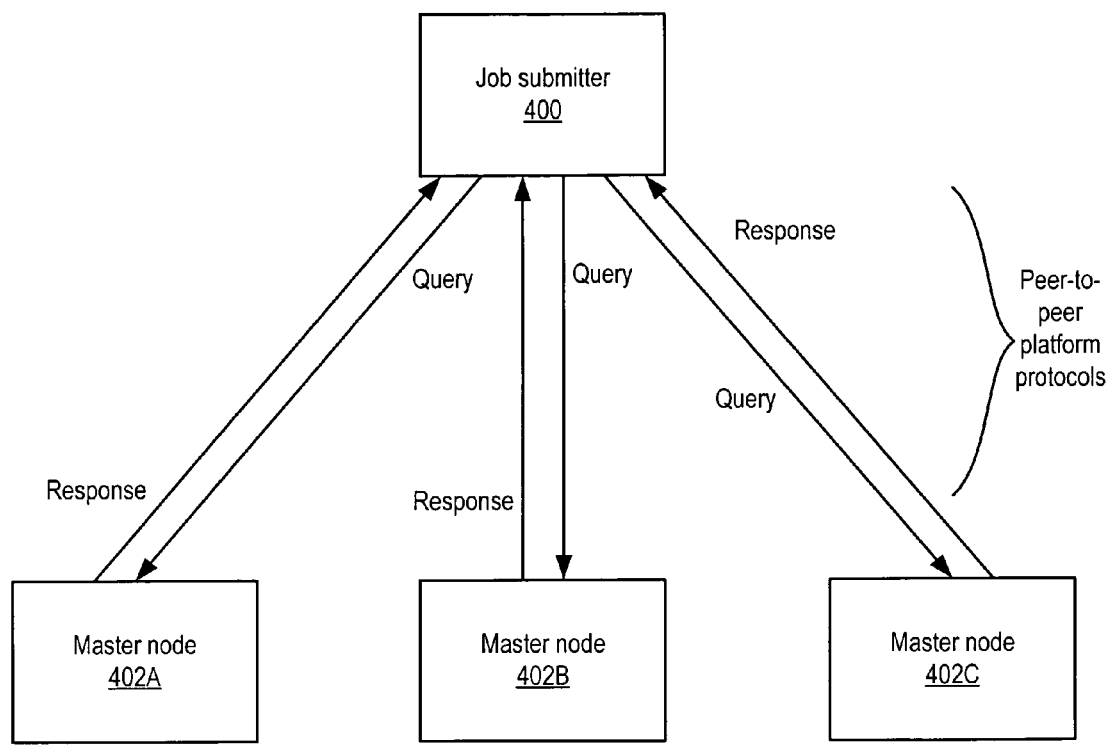
FIG. 7 illustrates multi-grid support according to one embodiment.

FIG. 7 illustrates multi-grid support according to one embodiment. In one embodiment, a job submitter 400 may discover multiple master nodes 402. The job submitter 400 may query the master nodes 402 for information; the master nodes 402 may return information to the job submitter 400 including one or more of, but not limited to: specific special resources or processing capabilities of the compute nodes managed by each master node 402, the number of pending jobs on each master node 402, anticipated delay, etc. Job submitter 402 may then use this information to select a grid for performing a particular job according to one or more criteria. For example, job submitter 402 may select a least busy grid or a grid with particular resources or processing capabilities needed to perform the job.

Figure 8:
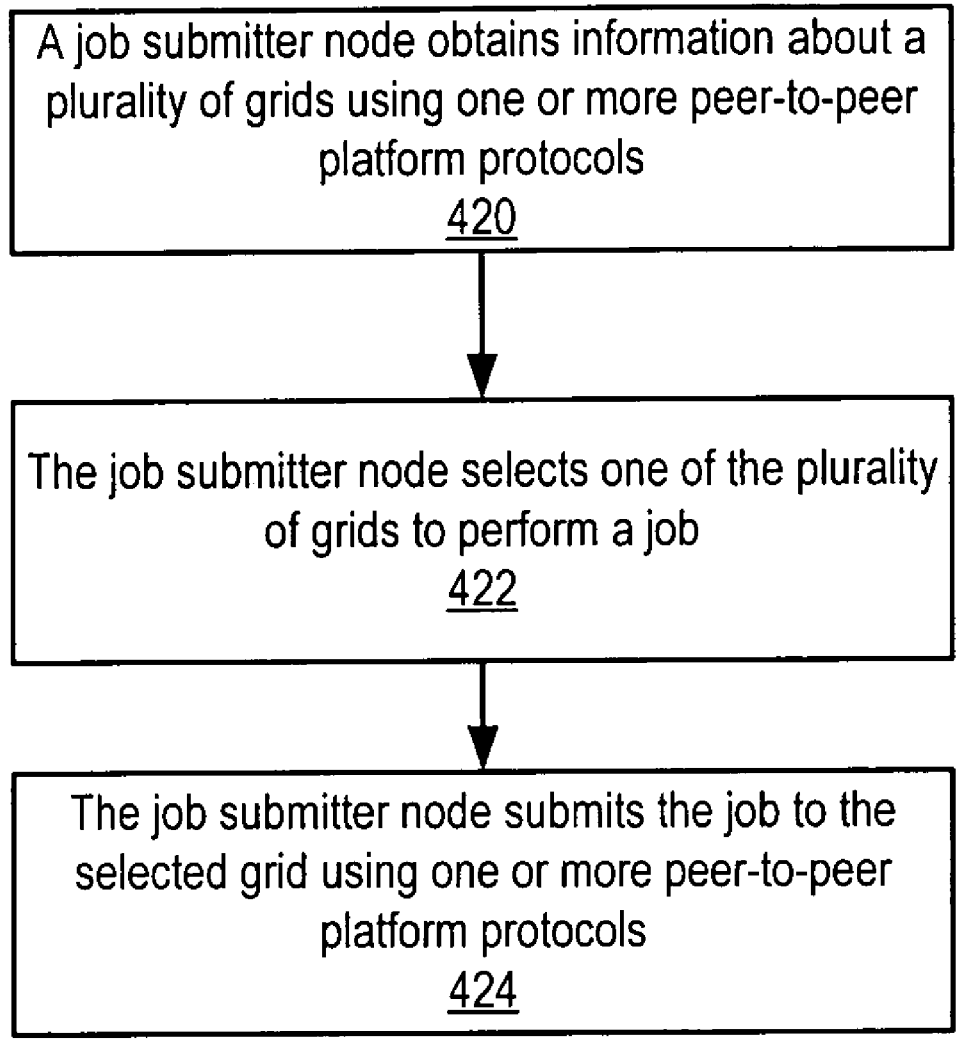
FIG. 8 is a flowchart of a method for selecting grids in a multi-grid environment according to one embodiment.

FIG. 8 is a flowchart of a method for selecting grids in a multi-grid environment according to one embodiment. As indicated at 420, a job submitter node may obtain information about a plurality of grids using one or more peer-to-peer platform protocols.

In one embodiment, the plurality of grids may be configured according to Sun Cluster Grid architecture. Other embodiments may use other grid architectures. In one embodiment, the peer-to-peer platform protocols may be JXTA protocols. Other embodiments may use other peer-to-peer platform protocols. As indicated at 422, the job submitter node may select one of the grids to perform a particular job. In one embodiment, the job submitter node may determine from the obtained information that the selected grid is best suited to perform the particular job based on one or more criteria including, but not limited to: speed of job execution (how quickly it is expected the grid can execute the job and return results) and one or more special processing requirements (e.g. graphics capabilities) for the compute nodes of the grid. As indicated at 424, after selecting the grid, the job submitter node may submit the particular job to the selected grid (and, potentially, additional jobs) using one or more peer-to-peer platform protocols.

Load Balancing

Embodiments of an autonomic grid computing mechanism may provide a mechanism for load balancing among grid farms using one or more peer-to-peer platform (e.g. JXTA) protocols. In one embodiment, before submitting a job to a grid farm, a job submitter may use one or more peer-to-peer platform protocols to search for a suitable grid farm in a multi-grid environment. Determining a suitable grid farm may be based on criteria such as how many jobs are pending in a grid's queue, if a grid farm has particular resources required to complete a job, etc. In one embodiment, a job submitter may determine which one of the grids is likely to complete the job faster considering the current load.

Self-Healing Grid Mechanism

Embodiments of a grid computing mechanism may provide a mechanism for self-healing in grid farms. In one embodiment, two or more nodes may be (manually) configured as master nodes. One or more of the configured master nodes may serve as actual or active master nodes, and one or more of the configured master nodes may be backup or "shadow" master nodes, not actively serving as master nodes. If an active master node goes down or becomes unavailable, the peer-to-peer (e.g. JXTA) protocols may be used to detect that the master node is not active and one of the other nodes configured as a master node may take over the master node operations for the grid of the (no longer available) master node.

FIGS. 9 through 13 illustrate means for detecting that a master node of a grid is no longer available using one or more peer-to-peer platform protocols and means for another node (a backup master node) to assume management of one or more compute nodes of the grid.

Figure 9:
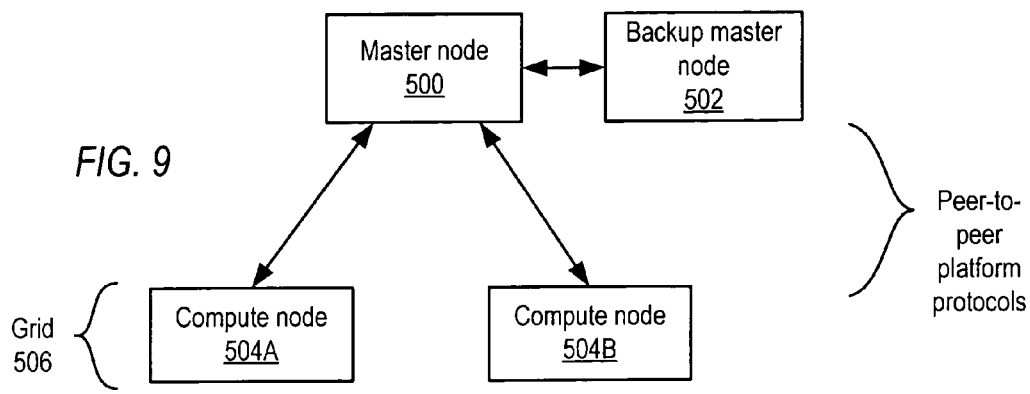
FIG. 9 illustrates a grid with a backup master node according to one embodiment.

Conventionally, grids have one master node, which presents the problem of a single point of failure. As illustrated in FIG. 9, one embodiment may provide one or more backup master nodes 502 that may be configured to take over operation of a grid if a master node 500 goes down. In one embodiment, a grid may discover that a master node 500 has gone down automatically using one or more peer-to-peer platform (e.g. JXTA) protocols. Another node (backup master node 502) may then replace the departed master node 500 as the master node of the grid, and may advertise that it is now the master node for the grid using the peer-to-peer platform protocols. Job submitters may then discover the new master node and submit jobs to the new master node using the peer-to-peer platform protocols. The compute nodes 504 that formerly communicated with the departed master node for job computation may update their grid configuration information to indicate that backup master node 502 is now the master node for the grid.

In one embodiment, a backup master node 502 may discover that the master node 500 has failed using the peer-to-peer platform protocols. In one embodiment, a backup master node 502 may periodically poll or attempt to discover the master node 500 using one or more peer-to-peer platform protocols, and upon determining that it can no longer discover the master node 500 may take over the role of master node for the grid. In one embodiment, the master node 500 may notify the backup master node 502 that it is leaving the grid using one or more peer-to-peer platform protocols.

Figure 10:
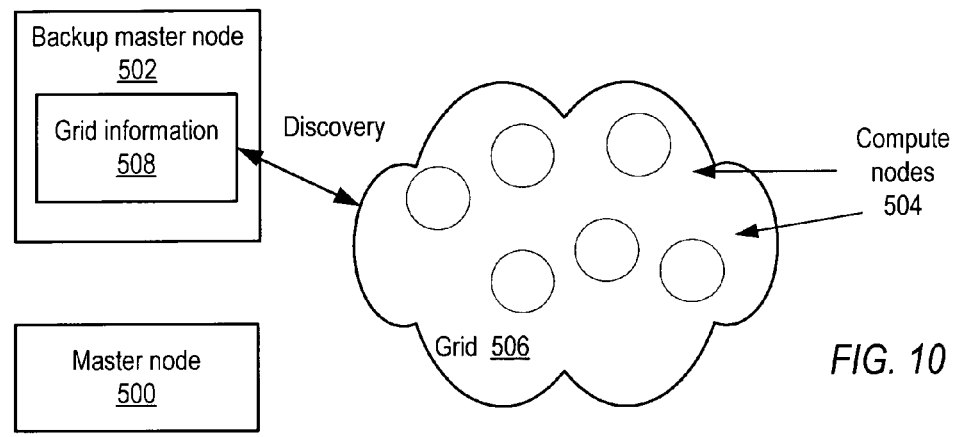
FIG. 10 illustrates a backup master node discovering compute nodes on a grid when assuming management of the grid according to one embodiment.
Figure 11:
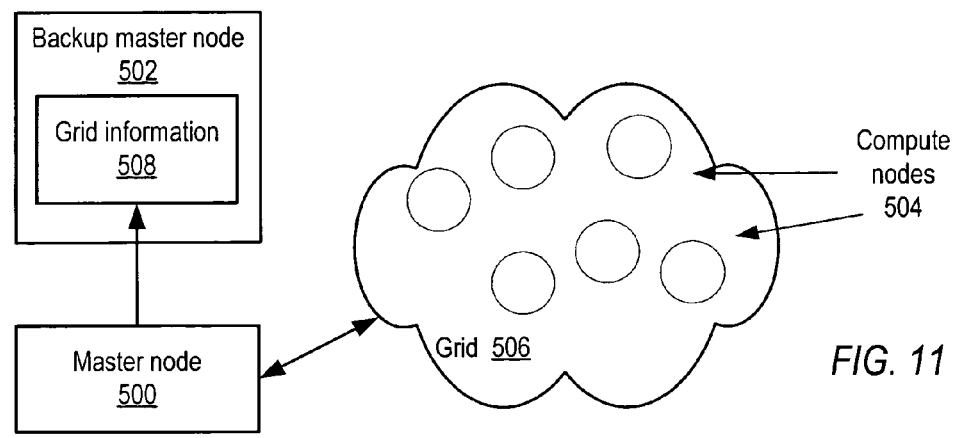
FIG. 11 illustrates a backup master node shadowing a master node according to one embodiment.

Typically, in a grid, the compute nodes 504 do not know about each other. A master node 500 may communicate with, control, and maintain information about the compute nodes 504. As illustrated in FIG. 10, in one embodiment, when the new master node (backup master node 502) takes over as master node of the grid 506, the backup master node 502 may use the peer-to-peer platform protocols to discover grid information 508 including the compute nodes 504 on the grid. As illustrated in FIG. 11, in one embodiment, backup master node 502 may "shadow" the master node 500 and keep updated information 508 about the grid network 506. In one embodiment, a backup master node 502 that is shadowing a master node 500 may maintain updated state information about jobs being performed by compute nodes 504 on the grid 506 using one or more peer-to-peer platform protocols. The backup master node 502 may keep an updated copy of current and/or pending job information, compute nodes 504, and other information necessary to take over the role of master node on the grid 506, preferably with little or no disruption of operations, using one or more peer-to-peer platform protocols. In one embodiment, after taking over the grid 506, the new master node (backup master node 502) may reconfigure the compute nodes 504 to inform them that it is now the master node using one or more peer-to-peer platform protocols.

Figure 12:
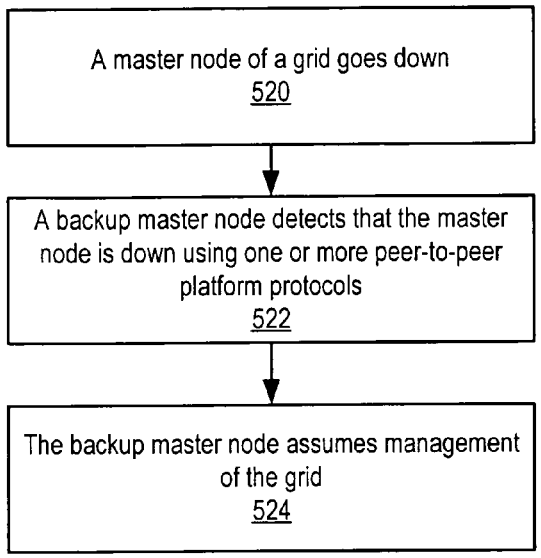
FIG. 12 is a flowchart illustrating operations of a grid with a backup master node according to one embodiment.

FIG. 12 is a flowchart illustrating operation of a grid with a backup master node according to one embodiment. In one embodiment, a backup master node may communicate with the master node of a grid using one or more peer-to-peer platform protocols to collect and maintain information about the one or more compute nodes of the grid. In one embodiment, the information about the one or more compute nodes may include, but is not limited to, state information about one or more jobs executing on the compute nodes. In one embodiment, the grid may be configured according to Sun Cluster Grid architecture. Other embodiments may use other grid architectures. In one embodiment, the peer-to-peer platform protocols may be JXTA protocols. Other embodiments may use other peer-to-peer platform protocols.

As indicated at 520, the master node managing operations of the grid may go down. As indicated at 522, the backup master node may detect that the master node is down using one or more peer-to-peer platform protocols. In one embodiment, the backup master node may poll the master node using one or more peer-to-peer platform protocols, and may determine that the master node is down if the master node does not respond to the poll. In one embodiment, the master node may send a notification to the backup master node to inform the backup master node that it is going down and that the backup master node needs to assume management of the grid. In other embodiments, other mechanisms may be used to detect if the master node is down.

As indicated at 524, the backup master node may assume management of the grid after determining that the master node is down. In one embodiment, assuming management of the grid may include advertising that the backup master node has assumed management of the grid using one or more peer-to-peer platform protocols. This advertisement may be discovered by other nodes, for example job submitter nodes, to determine that the backup master node is now acting as master node for the grid. In one embodiment, assuming management of the grid may include the backup master node discovering the one or more compute nodes of the grid using one or more peer-to-peer platform protocols. In one embodiment, assuming management of the grid may include the backup master node notifying the one or more compute nodes of the grid that the backup master node has assumed management of the grid using one or more peer-to-peer platform protocols. The compute nodes may update their grid configuration information to indicate that the backup master node has assumed management of the grid in response to the notification.

Figure 13:
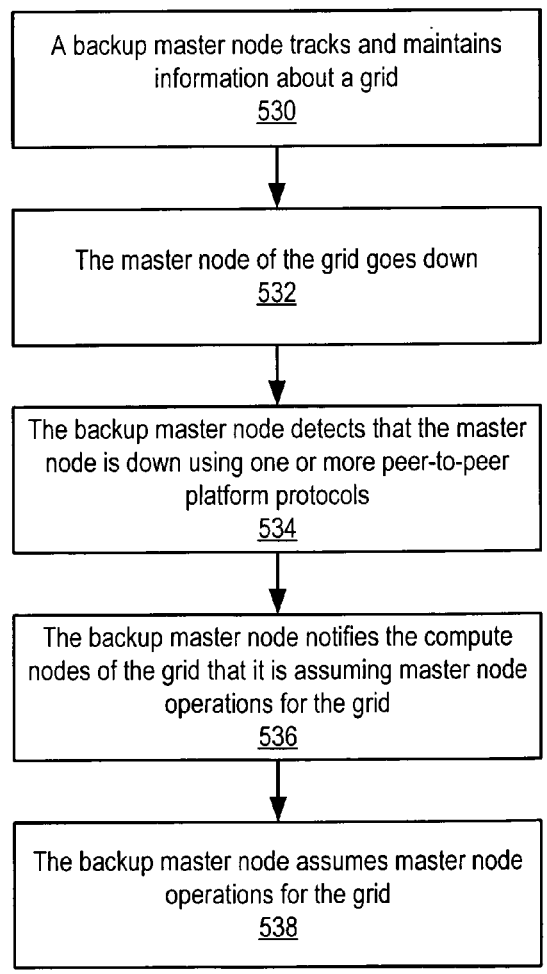
FIG. 13 is a flowchart illustrating self-healing of a grid when a master node goes down and is replaced by a backup master node according to one embodiment.

FIG. 13 is a flowchart illustrating self-healing of a grid when a master node goes down and is replaced by a backup master node according to one embodiment. As indicated at 530, a backup master node may track and maintain information about a grid. In one embodiment, the backup master node may communicate with the master node of the grid using one or more peer-to-peer platform protocols to collect and maintain information about the one or more compute nodes of the grid. In one embodiment, the information about the one or more compute nodes may include, but is not limited to, state information about one or more jobs executing on the compute nodes. In one embodiment, the grid may be configured according to Sun Cluster Grid architecture. Other embodiments may use other grid architectures. In one embodiment, the peer-to-peer platform protocols may be JXTA protocols. Other embodiments may use other peer-to-peer platform protocols.

As indicated at 532, the master node managing operations of the grid may go down. As indicated at 534, the backup master node may detect that the master node is down using one or more peer-to-peer platform protocols. In one embodiment, the backup master node may poll the master node using one or more peer-to-peer platform protocols, and may determine that the master node is down if the master node does not respond to the poll. In one embodiment, the master node may send a notification to the backup master node to inform the backup master node that it is going down and that the backup master node needs to assume management of the grid. In other embodiments, other mechanisms may be used to detect if the master node is down.

As indicated at 536, the backup master node may notify the compute nodes of the grid that it is assuming master node operations for the grid after determining that the master node is down. To determine the compute nodes of the grid, in one embodiment, the backup master node may discover compute nodes of the grid using one or more peer-to-peer platform protocols. In another embodiment, information about the one or more compute nodes of the grid may be obtained from the master node and maintained by the backup master node using one or more peer-to-peer platform protocols. In one embodiment, the backup master node may notify the one or more compute nodes of the grid that the backup master node is assuming management of the grid using one or more peer-to-peer platform protocols. The compute nodes may then update their grid configuration information to indicate that the backup master node is assuming management of the grid in response to the notification. In one embodiment, the backup master node may advertise that it is assuming management of the grid using one or more peer-to-peer platform protocols. Potential or existing compute nodes and any other node, for example job submitter nodes, may then discover that the backup master node is now the master node for the grid using one or more peer-to-peer platform protocols. As indicated at 538, the backup master node may then assume normal master node operations for the grid.

Figure 14A:
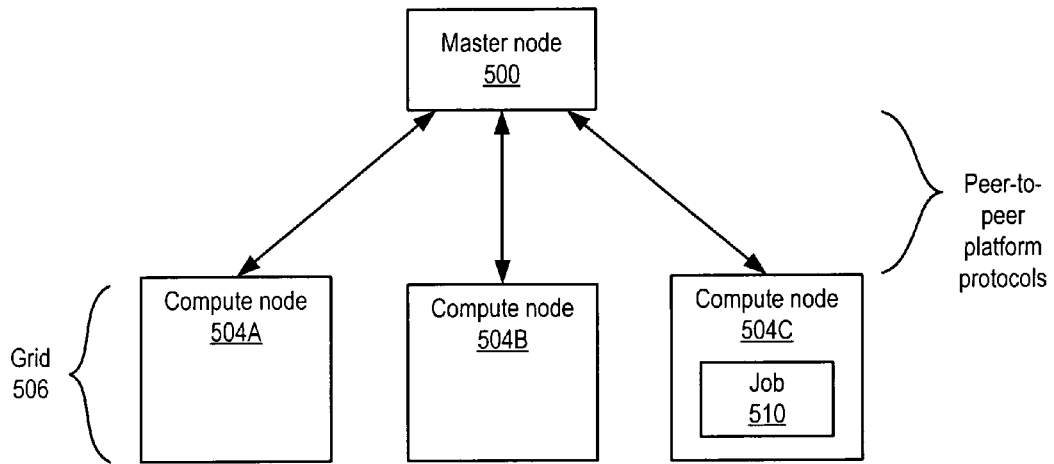
FIGS. 14A and 14B illustrate self-healing of a grid when a compute node leaves the grid, according to one embodiment.
Figure 14B:
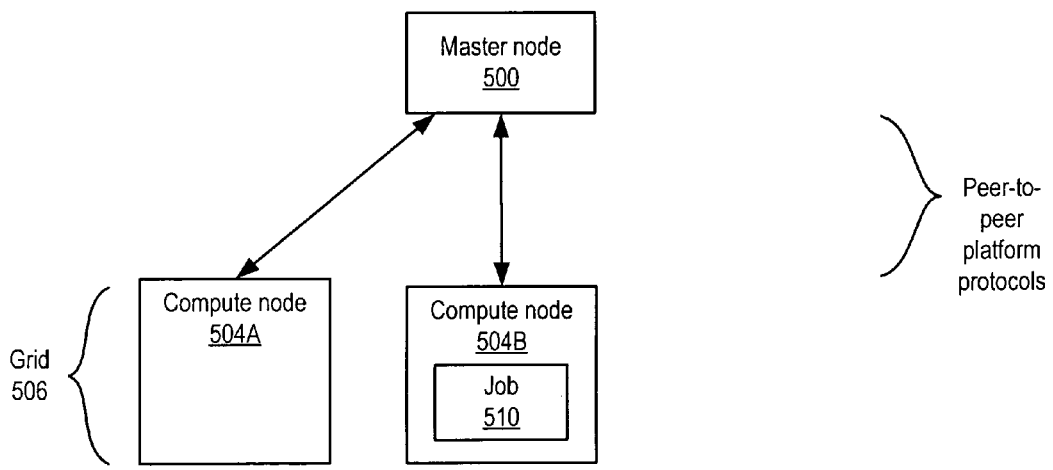

FIGS. 14A and 14B illustrate self-healing of a grid when a compute node leaves the grid, according to one embodiment. In FIG. 14A, for example, compute node 504C may leave the grid 506 for some reason. In one embodiment, if one of the compute nodes 504 (e.g. compute node 504C) goes away, the master node 500 may determine, using peer-to-peer platform protocols, that the compute node 504C is no longer part of the grid 506. In one embodiment, the compute node 504C may send notification of departure to the master node 500 using a peer-to-peer platform protocol. Alternatively, the master node 500 may poll the compute nodes 504 using one or more peer-to-peer platform protocols to determine if a compute node 504 goes down. As illustrated in FIG. 14B, after determining that a compute node 504 (e.g. compute node 504C of FIG. 14A) is no longer available, the master node 504 does not submit new jobs to the compute node. If the compute node 504C was working on a job (e.g. job 510 in FIG. 14A) when it became unavailable, the master node 504 may submit the job to another compute node for completion using one or more peer-to-peer platform protocols. In this example, master node 500 has submitted job 510 to compute node 504B. In one embodiment, the master node may maintain information about the status of a job, and may submit the job to another compute node for continuation of processing from the point that the former compute node had reached in performing the job. Alternatively, the master node may submit the job to the other compute node to be restarted from the beginning. In one embodiment, if the master node discovers a compute node has left the grid before completing a job, the master node may resubmit the job to another compute node using one or more peer-to-peer platform protocols transparently to the job submitter, i.e. without the job submitter being aware of it.

Grid Brokering

Embodiments of an autonomic grid computing mechanism may provide a mechanism for grid brokering. In one embodiment, if a grid has too many pending jobs, or if it has certain jobs pending for which it cannot find a suitable execution host (e.g., due to resource requirements which cannot be fulfilled), one or more peer-to-peer platform (e.g. JXTA) protocols may be used by the grid master node to discover one or more other grids and to determine if these other grids can take some of the job load, or can perform a job with special requirements. In one embodiment, out of all possible grids, the grid brokering mechanism may be used to determine which grid is best suited to accept which jobs.

In one embodiment, if the master node determines it may not be able to handle a job submitted by a job submitter (e.g. due to overload or missing resource requirements), the master node may try to find another grid (and another master node) that can handle the job (or part of a job) using one or more peer-to-peer platform protocols. In other words, the master node may subcontract a job, e.g. determine if there is another grid that can perform the job (or part of a job) and forward the job to the other grid for execution using one or more peer-to-peer platform protocols.

Figure 15:
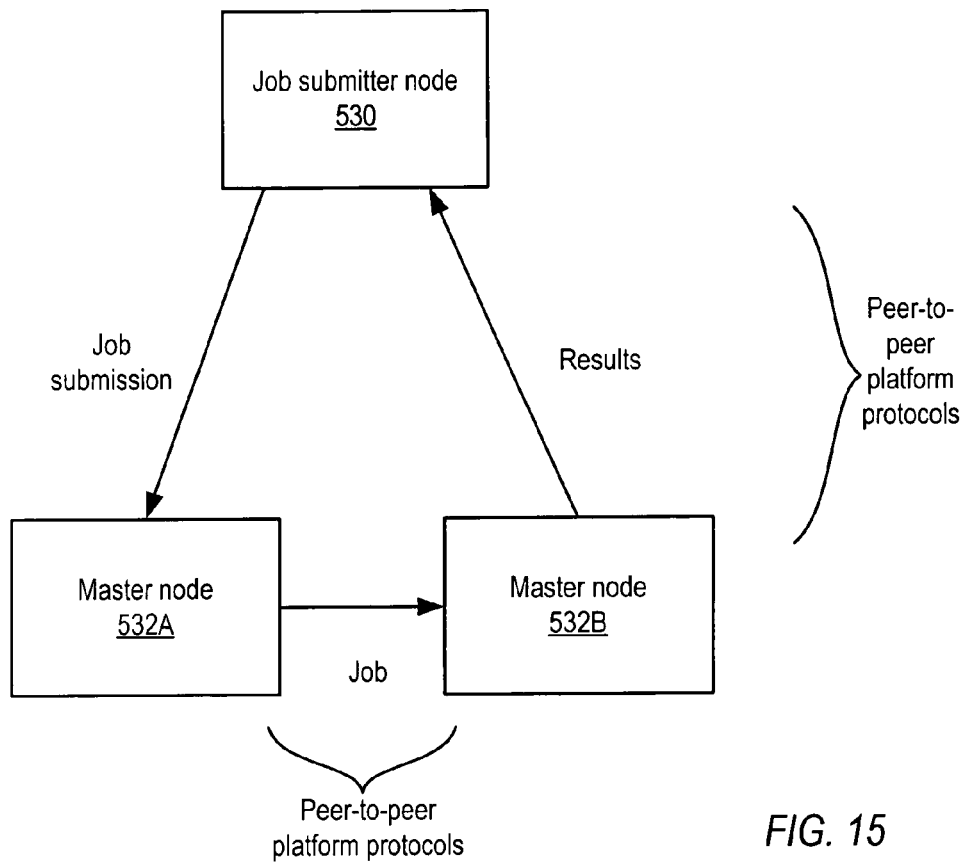
FIG. 15 illustrates grid brokering according to one embodiment.

FIG. 15 illustrates grid brokering according to one embodiment. Master node 532A may receive a job from job submitter node 530 via one or more peer-to-peer platform protocols. Master node 532A may determine that the grid is too busy to handle the job in a timely manner, and/or that the grid lacks one or more resources to perform special requirements of the job. Master node 532A may then use one or more peer-to-peer platform protocols and discovery mechanisms to search for and communicate with one or more other grids to locate one or more grids that are able to handle the job or part of the job (e.g. the grids are less busy and/or have the resources to perform special requirements of the job). In this example, master node 532A determines that a grid managed by master node 532B can handle the job or part of the job, and then forwards the job (or part of the job) to master node 532B for execution on the grid, in one embodiment using one or more peer-to-peer platform protocols. Master node 532B may send results of job execution to job submitter node 530, or alternatively may return results to master node 532A which may then send the results to job submitter node 530, in one embodiment using one or more peer-to-peer platform protocols.

Figure 16:
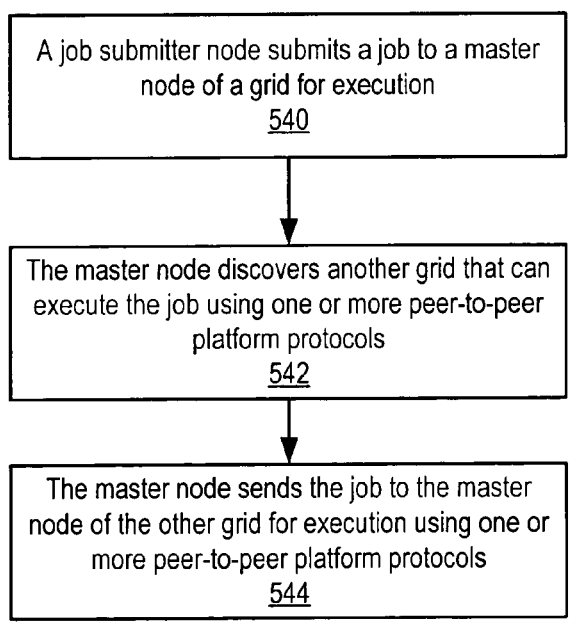
FIG. 16 is a flowchart of a method for grid brokering according to one embodiment.

FIG. 16 is a flowchart of a method for grid brokering according to one embodiment. As indicated at 540, a job submitter node may submit a job to a master node of a grid for execution. The master node may determine that the grid cannot handle the job for some reason (e.g., overload or missing resource requirements). As indicated at 542, the master node may then discover another grid that can execute the job using one or more peer-to-peer platform protocols. As indicated at 544, the master node may then send the job (or part of the job) to a master node of the other grid for execution using one or more peer-to-peer platform protocols. In one embodiment, the grids may be configured according to Sun Cluster Grid architecture. Other embodiments may use other grid architectures. In one embodiment, the peer-to-peer platform protocols may be JXTA protocols. Other embodiments may use other peer-to-peer platform protocols.

Decentralized Grids

Embodiments of an autonomic grid computing mechanism may provide a mechanism for decentralized grids where job submitters can directly select compute nodes and directly submit jobs to the selected compute nodes without going through master nodes.

Figure 17:
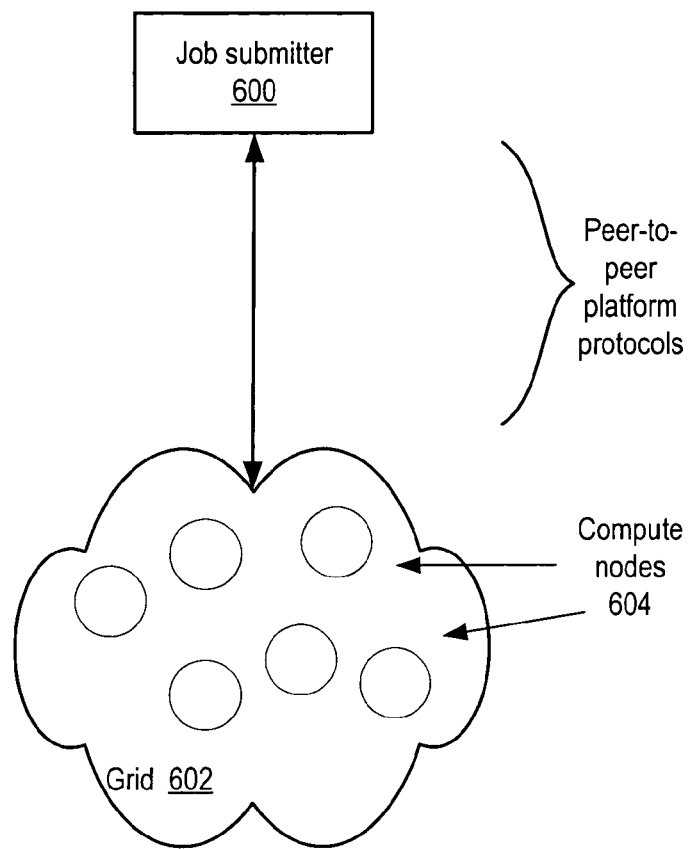
FIG. 17 illustrates decentralized grids according to one embodiment.

In a typical prior art grid configuration, the Master node acts as a centralized server, and thus may become a bottleneck. In one embodiment, as illustrated in FIG. 17, peer-to-peer platform protocols may be used to implement decentralized grids that may preferably reduce or eliminate the bottleneck problem by reducing or eliminating the role of Master node. In one embodiment, in a decentralized grid, a job submitter 600 may directly search for a compute node 604 that is suitable to run a job using one or more peer-to-peer platform protocols, and then may directly submit the job to the compute node 604 using one or more peer-to-peer platform protocols, hence bypassing the need for a master node. In essence, the decentralized grid is a two-tier architecture that eliminates the middle tier of the prior art cluster grid architecture by merging the management functions with the access tier.

Figure 18:
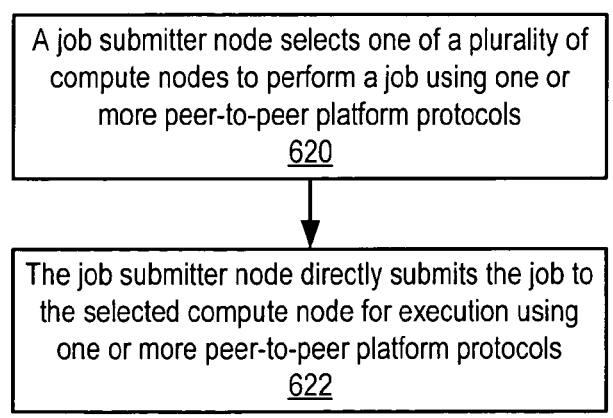
FIG. 18 is a flowchart of a method for submitting jobs in a decentralized grid according to one embodiment.

FIG. 18 is a flowchart of a method for submitting jobs in a decentralized grid according to one embodiment. As indicated at 620, a job submitter node may directly select one of a plurality of compute nodes to perform a job using one or more peer-to-peer platform protocols. As indicated at 622, the job submitter node may then directly submit the job to the selected compute node for execution using one or more peer-to-peer platform protocols. The compute node may directly return results of execution to the job submitter node. In this method, the job submitter node bypasses master nodes, and thus in one embodiment of decentralized grids there may be no master nodes in grids. In one embodiment, the job submitter node and compute nodes may be configured according to Sun Cluster Grid architecture. Other embodiments may use other grid architectures. In one embodiment, the peer-to-peer platform protocols may be JXTA protocols. Other embodiments may use other peer-to-peer platform protocols.

Monitoring Nodes in a Grid Farm

Embodiments of an autonomic grid computing mechanism may provide a mechanism for monitoring nodes in a grid farm. In one embodiment, a master node may maintain a database of other nodes (e.g. compute nodes) in the grid farm. In one embodiment, one or more peer-to-peer platform protocols (e.g., JXTA's Peer Information Protocol) may be used by the master node to query the other nodes about the nodes' status. The status may include one or more of, but is not limited to: current queue length, current pending jobs, estimated time to complete a current job, etc.

In one embodiment, a master node may discover information about the compute nodes using one or more peer-to-peer platform protocols. The master node may monitor the compute nodes and perform administration of the grid. In one embodiment, compute nodes may discover information about one or more master nodes using one or more peer-to-peer platform protocols. The compute nodes may monitor the master node; for example, to determine the status of the master node.

In one embodiment, there may be a separate node (e.g. a peer in a peer-to-peer network), referred to as a monitor node, running a monitor application. The monitor node may keep status information for one or more master nodes and their associated grids (compute nodes). In one embodiment, the monitor node may use one or more peer-to-peer platform protocols to poll or otherwise obtain grid information from the master node(s). In one embodiment, the master node(s) may maintain status information about the compute nodes on the grid(s). If a compute node leaves or joins the grid, the peer-to-peer platform protocols may be used to update the master node with the information, and a grid configuration maintained by the monitor application on the separate node may be updated accordingly using the peer-to-peer platform protocols.

Figure 19:
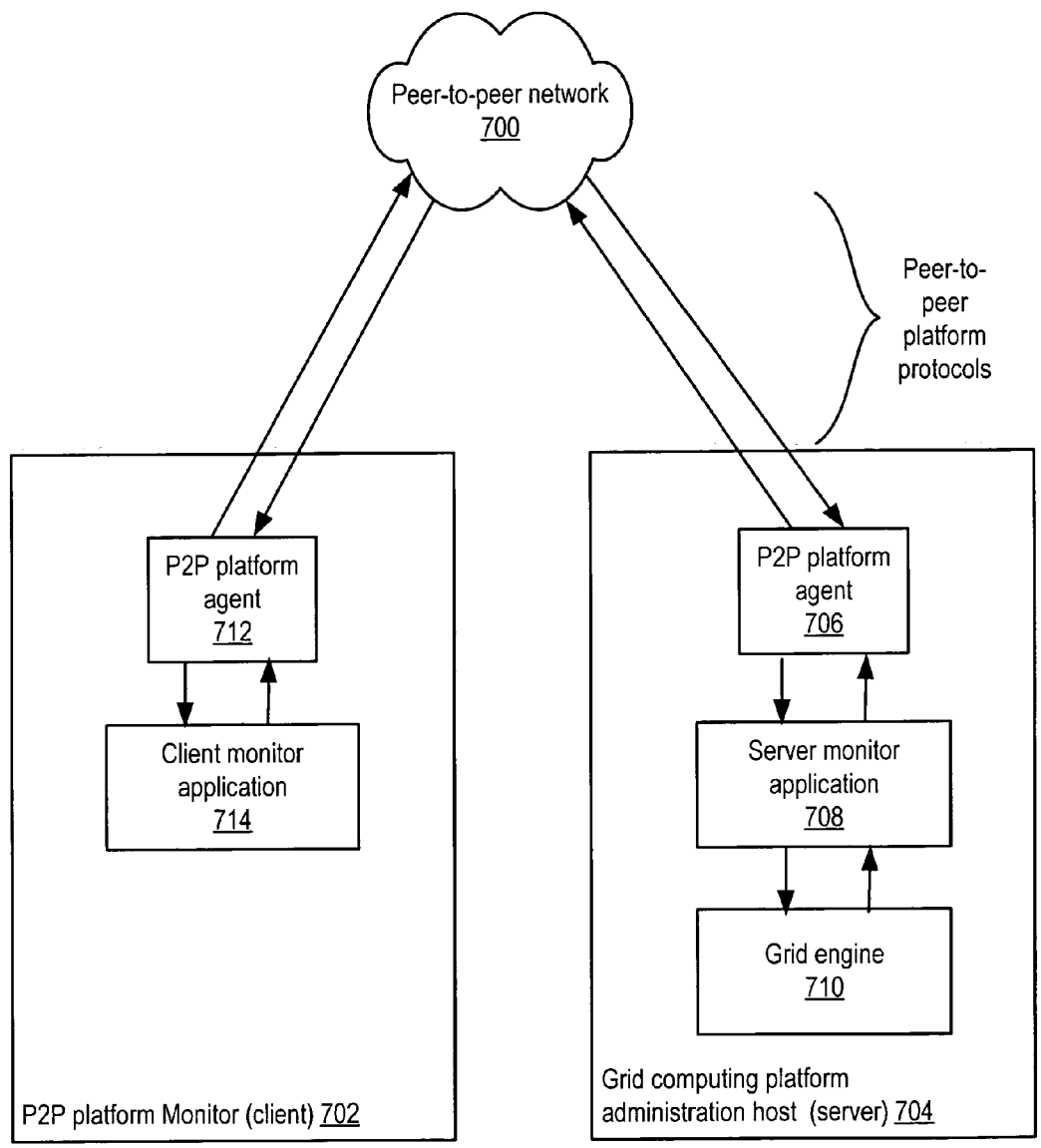
FIG. 19 illustrates grid monitoring according to one embodiment.

FIG. 19 illustrates grid monitoring according to one embodiment. In one embodiment, peer-to-peer platform (e.g. JXTA) agents (706 and 712) may be used to monitor a grid over a peer-to-peer network. In one embodiment, the grid management/monitoring system may be a client/server model, with a server application on an administration host within the grid. In one embodiment, that may be on the same system or on a different system from that of the Distributed Resource Management System (DRMS) (i.e. master host node) depending on implementation and constraints of the DRMS. In one embodiment as illustrated in FIG. 19, a Grid Engine 710 may be administered indirectly via an administration host 704 defined by a system administrator. The client software may reside on any platform that can communicate via the peer-to-peer platform protocols. These platforms may be personal computers, servers, workstations, PDAs, mobile phones, or any system with a digital heartbeat and capable of hosting the client software.

The server side of the client/server model is represented by administration host 704 in FIG. 19. In one embodiment, the Server Monitor Application 708 may poll the Master Host(s) on the grid(s) on peer-to-peer network 700. The Server Monitor Application 708 may obtain the status of the queues and the nodes within the cluster from the Grid Master. The Server Monitor Application 708 may then make the data available to the peer-to-peer platform agent 712 on the master side.

In one embodiment, the P2P platform agent 706 may connect to a relay/rendezvous node on the peer-to-peer platform network 700 and create a group. This group may then be joined by other peers within the peer-to-peer network, allowing them to communicate with each other using one or more peer-to-peer platform protocols. The P2P platform agent 706 may then broadcast this information to the rest of the group.

The client side of the client/server model is represented by P2P platform monitor 702 in FIG. 19. P2P platform agent 712 may poll the peer-to-peer platform network for messages from the grid peer group, and may cache results to be used by the client grid monitor application 714. Client monitor application 714 may access the cached data, for example to display the data from the grid, either dynamically or on request, to the user.

Figure 20:
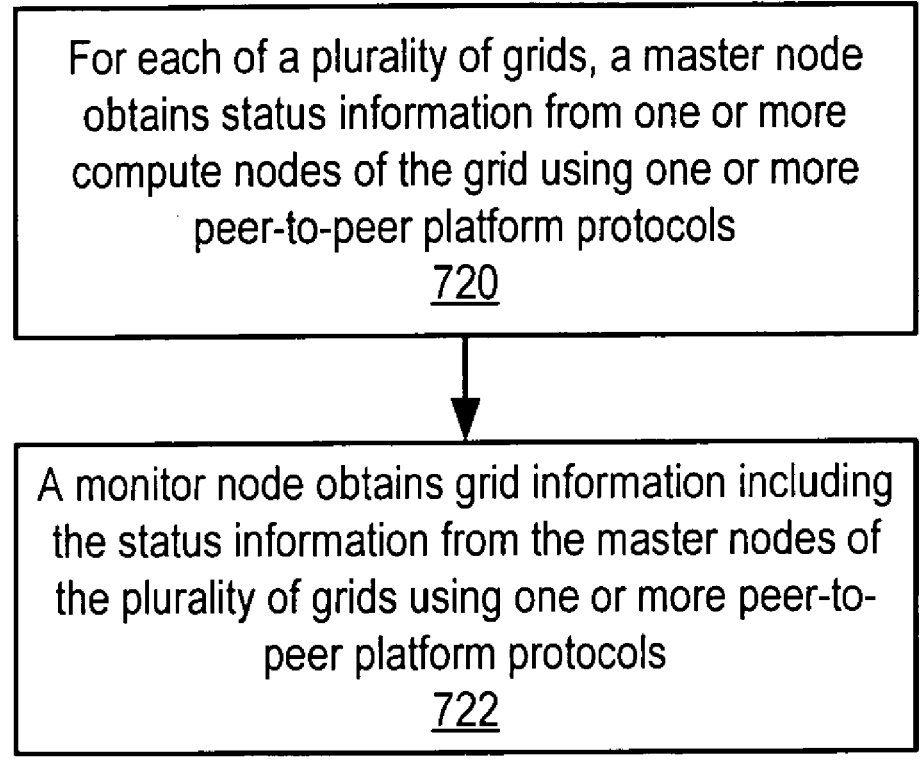
FIG. 20 is a flowchart of a method of monitoring grids according to one embodiment.

FIG. 20 is a flowchart of a method of monitoring grids according to one embodiment. As indicated at 720, for each of a plurality of grids, a master node of the grid may obtain status information from one or more compute nodes of the grid using one or more peer-to-peer platform protocols. As indicated at 722, a monitor node may obtain grid information including the status information from the master nodes via one or more peer-to-peer platform protocols. In one embodiment, the grid information obtained by the monitor node may be used in monitoring and administering the grids. In one embodiment, the grids may be configured according to Sun Cluster Grid architecture. Other embodiments may use other grid architectures. In one embodiment, the peer-to-peer platform protocols may be JXTA protocols. Other embodiments may use other peer-to-peer platform protocols.

Grid Administration Mechanism

In one embodiment, peer-to-peer platform (e.g. JXTA) protocols may be used to remotely administer one or more grids, decentralized grids, and/or grids in a multi-grid environment, for example using communication (e.g. JXTA pipe) protocols. A grid administration node may include one or more grid administration applications for managing the grids using the peer-to-peer platform. In one embodiment, the administration node may also include a monitor mechanism to monitor the grid(s). An exemplary grid administration tasks that may be performed using embodiments is adding or removing one or more machines depending on load. Another example is gathering statistics, for example, price/performance statistics, for use in decision making. The gathered statistics may be used to answer questions such as: Is this grid viable? Are more machines needed? When would be the right time to buy new machines? Gathered statistics may also be used in making load predictions. Other administrative tasks than these exemplary tasks may be performed using embodiments.

Figure 21:
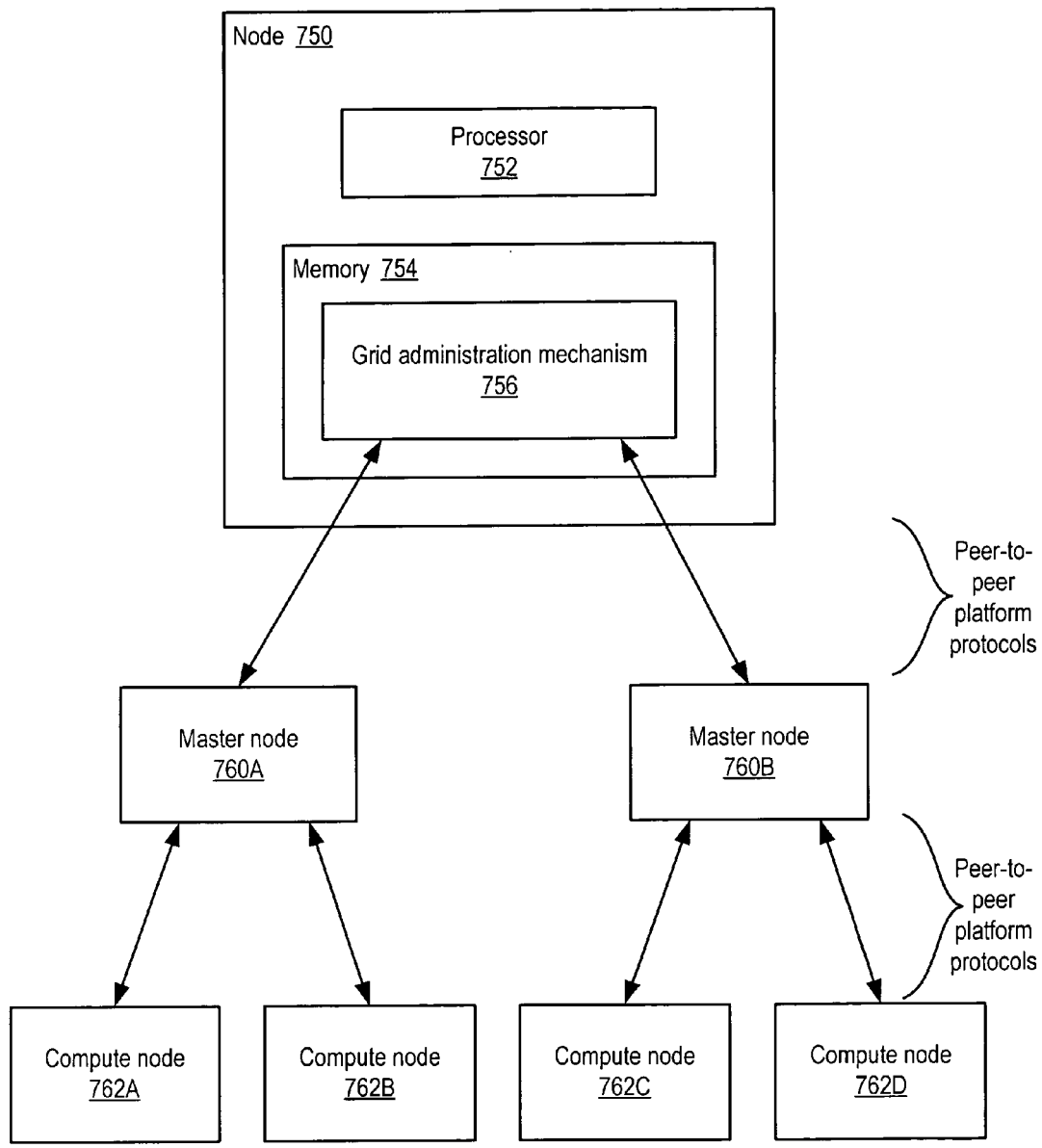
FIG. 21 illustrates a system (node) implementing a grid administration mechanism according to one embodiment.

FIG. 21 illustrates a system (node 750) implementing a grid administration mechanism according to one embodiment. Node 750 may be any of various types of devices, including, but not limited to, a personal computer system, desktop computer, laptop or notebook computer, mainframe computer system, workstation, network computer, or other suitable device. Node 750 may include at least one processor 752. The processor 752 may be coupled to a memory 754. Memory 754 is representative of various types of possible memory media, also referred to as "computer readable media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof. Node 750 may couple over a network to one or more other devices via one or more wired or wireless network interfaces.

Node 750 may include, in memory 754, a grid administration mechanism 756. Master nodes 760 may use one or more peer-to-peer platform protocols to gather information from compute nodes 762. Grid administration mechanism 756 may use one or more peer-to-peer platform protocols to gather grid information from master nodes 760. This grid information may include information collected from compute nodes 762. Grid administration mechanism 756 may be used to remotely perform various administrative and monitoring tasks for the grids using one or more peer-to-peer platform protocols. At least part of the grid information may be displayed for the user on node 750 by grid administration mechanism 756.

Figure 22:
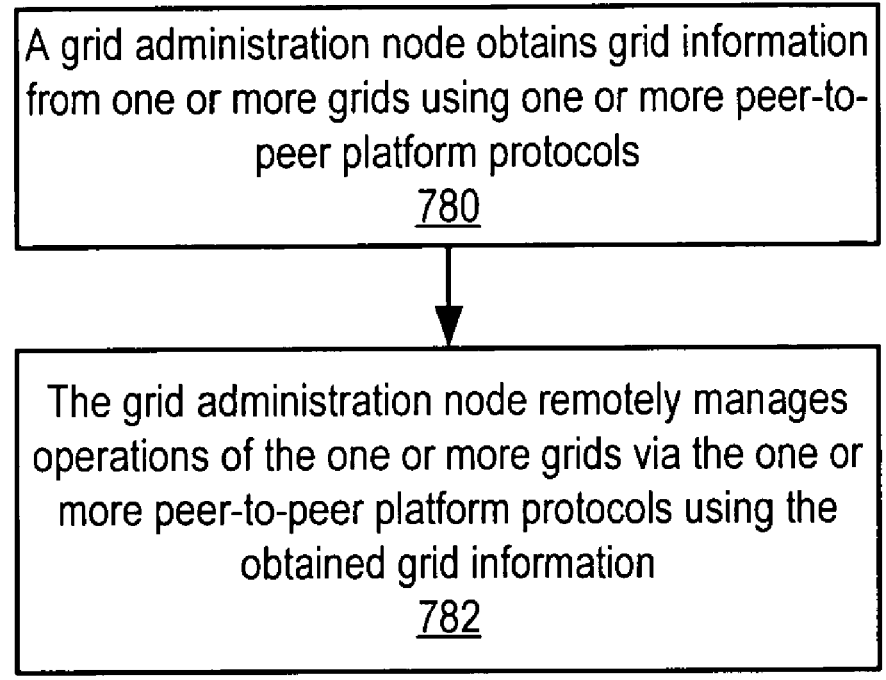
FIG. 22 is a flowchart of a method for remote administration of grids according to one embodiment.

FIG. 22 is a flowchart of a method for remote administration of grids according to one embodiment. As indicated at 780, a grid administration node may obtain grid information from one or more grids using one or more peer-to-peer platform protocols. The grid administration node may remotely manage operations of the one or more grids via one or more peer-to-peer platform protocols and using the obtained grid information. In one embodiment, the grids may be configured according to Sun Cluster Grid architecture. Other embodiments may use other grid architectures. In one embodiment, the peer-to-peer platform protocols may be JXTA protocols. Other embodiments may use other peer-to-peer platform protocols.

CONCLUSION

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A grid computing system, comprising:
    a grid comprising a plurality of compute nodes each implemented on one of one or more computer devices and each participating in the grid with current grid software on the respective computer device to perform one or more compute jobs;
    a separate computer device that during operations implements a master node that manages membership of the grid and job submission of the grid;
    wherein, to manage the membership of the grid, the master node configures computer devices as additional compute nodes in the grid and removes compute nodes from the grid, wherein, to configure a computer device as an additional compute node in the grid, the master node sends grid configuration information to the compute node in accordance with one or more peer-to-peer platform protocols, wherein the additional compute nodes are members of the grid and are capable of receiving compute jobs from the master node, wherein removed compute nodes are not members of the grid and are not capable of receiving compute jobs from the master node, and wherein the grid configuration information includes an indication of current grid software for the respective computer device to perform one or more compute jobs on the respective compute node;
    wherein, to manage job submission of the grid, the master node distributes compute jobs submitted to the master node by one or more job submitters to the compute nodes in the grid for execution in accordance with the one or more peer-to-peer platform protocols and provides results of said execution to the one or more job submitters; and
    a separate computer device that during operations implements a backup master node that:
        detects that the master node is down in accordance with the one or more peer-to-peer platform protocols; and
        assumes said management of the grid in response to said detection.

2. The grid computing system as recited in claim 1, wherein, to assume management of the plurality of compute nodes in response to said detection, the backup master node advertises that the backup master node has assumed management of the plurality of compute nodes in accordance with the one or more peer-to-peer platform protocols.

3. The grid computing system as recited in claim 1, wherein, to assume management of the grid in response to said detection, the backup master node discovers the plurality of compute nodes in the grid in accordance with the one or more peer-to-peer platform protocols.

4. The grid computing system as recited in claim 1, wherein the backup master node further communicates with the master node in accordance with the one or more peer-to-peer platform protocols to maintain information about the plurality of compute nodes in the grid prior to said detection.

5. The grid computing system as recited in claim 4, wherein the information about the plurality of compute nodes in the grid includes state information about one or more jobs executing on the compute nodes.

6. The grid computing system as recited in claim 1, wherein, to assume management of the grid in response to said detection, the backup master node notifies the plurality of compute nodes in the grid, in accordance with the one or more peer-to-peer platform protocols, that the backup master node has assumed management of the.

7. The grid computing system as recited in claim 6, wherein the plurality of compute nodes update grid configuration information to indicate that the backup master node has assumed management of the grid in response to said notification.

8. The grid computing system as recited in claim 1, wherein, to detect that the master node is down in accordance with the one or more peer-to-peer platform protocols, the backup master node:
    polls the master node in accordance with the one or more peer-to-peer platform protocols; and
    detects that the master node is down if the master node does not respond to the poll.

9. The grid computing system as recited in claim 1, wherein the grid computing system further comprises a job submitter node, and wherein, to manage the grid, the master node:
    receives a job from the job submitter node in accordance with the one or more peer-to-peer platform protocols;
    distributes the job to the compute nodes in the grid for execution in accordance with the one or more peer-to-peer platform protocols;
    receives results of the execution from the compute nodes in the grid in accordance with the one or more peer-to-peer platform protocols; and
    sends the results to the job submitter node in accordance with the one or more peer-to-peer platform protocols.

10. The grid computing system as recited in claim 1, wherein the grid computing system is configured according to Sun Cluster Grid architecture.

11. The grid computing system as recited in claim 1, wherein the peer-to-peer platform protocols are JXTA protocols.

12. The grid computing system as recited in claim 1, wherein, to manage the grid, the master node detects that one of the compute nodes is no longer participating as a compute node in the grid in accordance with the one or more peer-to-peer platform protocols.

13. The grid computing system as recited in claim 1, wherein, to manage the grid, the master node:
    submits a job to one of the compute nodes in the grid for execution in accordance with the one or more peer-to-peer platform protocols;

detects that the compute node is no longer participating as a compute node in the grid in accordance with the one or more peer-to-peer platform protocols; and resubmits the job to another one of the compute nodes in the grid for execution in accordance with the one or more peer-to-peer platform protocols.

14. A grid computing system, comprising:

means for implementing a grid comprising a plurality of compute nodes each implemented on one of one or more computer devices and each participating in the grid with current grid software on the respective computer device to perform one or more compute jobs;

means for detecting that a master node that manages membership of the grid and job submission of the grid is no longer available using one or more peer-to-peer platform protocols;

wherein, to manage the grid membership, the master node is configured to configure computer devices as additional compute nodes in the grid and remove compute nodes from the grid, wherein, to configure a computer device as an additional compute node in the grid, the master node sends grid configuration information to the compute node in accordance with one or more peer-to-peer platform protocols, wherein the additional compute nodes are members of the grid and are capable of receiving compute jobs from the master node, wherein removed compute nodes are not members of the grid and are not capable of receiving compute jobs from the master node, and wherein the grid configuration information includes an indication of current grid software for the respective computer device to perform one or more compute jobs on the respective compute node; and wherein, to manage job submission of the grid, the master node is configured to distribute compute jobs submitted to the master node by one or more job submitters to the compute nodes in the grid for execution in accordance with the one or more peer-to-peer platform protocols and provide results of said execution to the one or more job submitters; and means for another node to:
  detect that the master node is down in accordance with the one or more peer-to-peer platform protocols; and
  assume said management of one or more compute nodes of the grid in response to said detection.

15. A method, comprising:

a master node managing membership and job submission of a grid comprising a plurality of compute nodes each implemented on one of one or more computer devices and each participating in the grid with current grid software on the respective computer device to perform one or more compute jobs;

wherein said managing membership of the grid comprises configuring computer devices as additional compute nodes in the grid and removing compute nodes from the grid, wherein, to configure a computer device as an additional compute node in the grid, the master node sends grid configuration information to the compute node in accordance with one or more peer-to-peer platform protocols, wherein the additional compute nodes are members of the grid and are capable of receiving compute jobs from the master node, wherein removed compute nodes are not members of the grid and are not capable of receiving compute jobs from the master node, and wherein the grid configuration information includes an indication of current grid software for the respective computer device to perform one or more compute jobs on the respective compute node; and wherein said managing job submission of the grid comprises distributing compute jobs submitted to the master node by one or more job submitters to the compute nodes in the grid for execution in accordance with the one or more peer-to-peer platform protocols and providing results of said execution to the one or more job submitters;

the master node going down;

a backup master node detecting that the master node is down in accordance with the one or more peer-to-peer platform protocols; and the backup master node assuming said management of the grid in response to said detecting that the master node is down.

16. The method as recited in claim 15, wherein said assuming management of the grid comprises advertising that the backup master node has assumed management of the grid in accordance with the one or more peer-to-peer platform protocols.

17. The method as recited in claim 15, wherein said assuming management of the grid comprises the backup master node discovering the plurality of compute nodes in the grid in accordance with the one or more peer-to-peer platform protocols.

18. The method as recited in claim 15, further comprising the backup master node communicating with the master node in accordance with the one or more peer-to-peer platform protocols to maintain information about the plurality of compute nodes in the grid prior to said detecting that the master node is down.

19. The method as recited in claim 18, wherein the information about the plurality of compute nodes in the grid includes state information about one or more jobs executing on the compute nodes.

20. The method as recited in claim 15, wherein said assuming management of the grid comprises the backup master node notifying the plurality of compute nodes in the grid, in accordance with the one or more peer-to-peer platform protocols, that the backup master node has assumed management of the grid.

21. The method as recited in claim 20, further comprising the plurality of compute nodes updating grid configuration information to indicate that the backup master node has assumed management of the grid in response to said notifying.

22. The method as recited in claim 15, wherein said detecting that the master node is down in accordance with the one or more peer-to-peer platform protocols comprises:
  polling the master node in accordance with the one or more peer-to-peer platform protocols; and
  detecting that the master node is down if the master node does not respond to the poll.

23. The method as recited in claim 15, wherein said managing operations of the grid comprises:
  the master node receiving a job from a job submitter node in accordance with the one or more peer-to-peer platform protocols;
  the master node distributing the job to the compute nodes in the grid for execution in accordance with the one or more peer-to-peer platform protocols;
  the master node receiving results of the execution from the compute nodes in the grid in accordance with the one or more peer-to-peer platform protocols; and
  the master node sending the results to the job submitter node in accordance with the one or more peer-to-peer platform protocols.

24. The method as recited in claim 15, wherein the grid is configured according to Sun Cluster Grid architecture.

25. The method as recited in claim 15, wherein the peer-to-peer platform protocols are JXTA protocols.

26. The method as recited in claim 15, wherein said managing operations of the grid comprises the master node detecting that one of the compute nodes is no longer participating as a compute node in the grid in accordance with the one or more peer-to-peer platform protocols.

27. The method as recited in claim 15, wherein said managing operations the grid comprises:
- the master node submitting a job to one of the compute nodes in the grid for execution in accordance with the one or more peer-to-peer platform protocols;
- the master node detecting that the compute node is no longer participating as a compute node in the grid in accordance with the one or more peer-to-peer platform protocols; and
- the master node resubmitting the job to another one of the compute nodes in the grid for execution in accordance with the one or more peer-to-peer platform protocols.

28. A non-transitory computer-readable storage medium storing program instructions, wherein the program instructions are computer-executable to implement:
- a master node managing membership and job submission of a grid comprising a plurality of compute nodes each implemented on one of one or more computer devices and each participating in the grid with current grid software on the respective computer device to perform one or more compute jobs;
- wherein said managing membership of the grid comprises configuring computer devices as additional compute nodes in the grid and removing compute nodes from the grid, wherein, to configure a computer device as an additional compute node in the grid, the master node sends grid configuration information to the compute node in accordance with one or more peer-to-peer platform protocols, wherein the additional compute nodes are members of the grid and are capable of receiving compute jobs from the master node, wherein removed compute nodes are not members of the grid and are not capable of receiving compute jobs from the master node, and wherein the grid configuration information includes an indication of current grid software for the respective computer device to perform one or more compute jobs on the respective compute node; and
- wherein said managing job submission of the grid comprises distributing compute jobs submitted to the master node by one or more job submitters to the compute nodes in the grid for execution in accordance with the one or more peer-to-peer platform protocols and providing results of said execution to the one or more job submitters;
- the master node going down;
- a backup master node detecting that the master node is down in accordance with the one or more peer-to-peer platform protocols; and
- the backup master node assuming said management of the grid in response to said detecting that the master node is down.

29. The computer-readable storage medium as recited in claim 28, wherein, in said assuming management of the grid, the program instructions are further computer-executable to implement advertising that the backup master node has assumed management of the grid in accordance with the one or more peer-to-peer platform protocols.

30. The computer-readable storage medium as recited in claim 28, wherein, in said assuming management of the grid, the program instructions are further computer-executable to implement the backup master node discovering the plurality of compute nodes in the grid in accordance with the one or more peer-to-peer platform protocols.

31. The computer-readable storage medium as recited in claim 28, wherein the program instructions are further computer-executable to implement the backup master node communicating with the master node in accordance with the one or more peer-to-peer platform protocols to maintain information about the plurality of compute nodes in the grid prior to said detecting that the master node is down.

32. The computer-readable storage medium as recited in claim 31, wherein the information about the plurality of compute nodes in the grid includes state information about one or more jobs executing on the compute nodes.

33. The computer-readable storage medium as recited in claim 28, wherein, in said assuming management of the plurality of compute nodes, the program instructions are further computer-executable to implement the backup master node notifying the plurality of compute nodes in the grid, in accordance with the one or more peer-to-peer platform protocols, that the backup master node has assumed management of the grid.

34. The computer-readable storage medium as recited in claim 33, wherein the program instructions are further computer-executable to implement the plurality of compute nodes updating grid configuration information to indicate that the backup master node has assumed management of the grid in response to said notifying.

35. The computer-readable storage medium as recited in claim 28, wherein, in said detecting that the master node is down in accordance with the one or more peer-to-peer platform protocols, the program instructions are further computer-executable to implement:
- polling the master node in accordance with the one or more peer-to-peer platform protocols; and
- detecting that the master node is down if the master node does not respond to the poll.

36. The computer-readable storage medium as recited in claim 28, wherein, in said managing operations of the grid, the program instructions are further computer-executable to implement:
- the master node receiving a job from a job submitter node in accordance with the one or more peer-to-peer platform protocols;
- the master node distributing the job to the compute nodes in the grid for execution in accordance with the one or more peer-to-peer platform protocols;
- the master node receiving results of the execution from the compute nodes in the grid in accordance with the one or more peer-to-peer platform protocols; and
- the master node sending the results to the job submitter node in accordance with the one or more peer-to-peer platform protocols.

37. The computer-readable storage medium as recited in claim 28, wherein the grid is configured according to Sun Cluster Grid architecture.

38. The computer-readable storage medium as recited in claim 28, wherein the peer-to-peer platform protocols are JXTA protocols.

39. The computer-readable storage medium as recited in claim 28, wherein, in said managing operations of the grid, the program instructions are further computer-executable to implement the master node detecting that one of the compute nodes is no longer participating as a compute node in the grid in accordance with the one or more peer-to-peer platform protocols.

40. The computer-readable storage medium as recited in claim 28, wherein, in said managing operations of the grid, the program instructions are further computer-executable to implement:

the master node submitting a job to one of the compute nodes in the grid for execution in accordance with the one or more peer-to-peer platform protocols;

the master node detecting that the compute node is no longer participating as a compute node in the grid in accordance with the one or more peer-to-peer platform protocols; and the master node resubmitting the job to another one of the compute nodes in the grid for execution in accordance with the one or more peer-to-peer platform protocols.

\* \* \* \* \*

UNITED STATES PATENT AND TRADEMARK OFFICE
CERTIFICATE OF CORRECTION

| | |
|---|---|
| PATENT NO. | : 8,041,798 B1 |
| APPLICATION NO. | : 10/828955 |
| DATED | : October 18, 2011 |
| INVENTOR(S) | : Kuldipsingh A. Pabla and Juan C. Soto |

It is certified that error appears in the above-identified patent and that said Letters Patent is hereby corrected as shown below:

In The Claims:

Claim 6, col. 20, line 24, after "of the" and before "." please insert --grid--.

Signed and Sealed this
Third Day of January, 2012

David J. Kappos
*Director of the United States Patent and Trademark Office*